United States Patent
Askeland et al.

(12)

(10) Patent No.: US 6,193,347 B1
(45) Date of Patent: Feb. 27, 2001

(54) HYBRID MULTI-DROP/MULTI-PASS PRINTING SYSTEM

(75) Inventors: Ronald A. Askeland; Paul E. Hunter, both of San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/016,478

(22) Filed: Jan. 30, 1998

Related U.S. Application Data

(63) Continuation of application No. 08/960,927, filed on Oct. 30, 1997, and a continuation of application No. 08/796,835, filed on Feb. 6, 1997, now Pat. No. 5,923,344.

(51) Int. Cl.[7] ............................... B41J 2/205; B41J 2/145
(52) U.S. Cl. ............................................... 347/15; 347/41
(58) Field of Search ................................ 343/37, 41, 9, 343/15, 40

(56) References Cited

U.S. PATENT DOCUMENTS

| 4,345,262 | 8/1982 | Shirato et al. | 347/10 |
|---|---|---|---|
| 4,503,444 | 3/1985 | Tacklind | 347/11 |
| 4,746,935 | 5/1988 | Allen | 347/98 |
| 4,789,425 | 12/1988 | Drake et al. | 216/27 |

(List continued on next page.)

FOREIGN PATENT DOCUMENTS

| 0259541A | 3/1988 | (EP) | H04N/1/032 |
|---|---|---|---|
| 0259541A2 | 3/1988 | (EP) | H04N/1/032 |
| 0259541A3 | 3/1988 | (EP) | H04N/1/032 |
| 0367541A2 | 5/1990 | (EP) . | |
| 0495670A1 | 7/1992 | (EP) . | |
| 0498292A2 | 8/1992 | (EP) . | |
| 0507124A2 | 10/1992 | (EP) . | |
| 0517 543 | 12/1992 | (EP) . | |
| 0636482A | 2/1995 | (EP) . | |
| 0638602A1 | 2/1995 | (EP) . | |
| 0728583A2 | 8/1996 | (EP) . | |
| 0749835A2 | 12/1996 | (EP) . | |
| 0763430A2 | 3/1997 | (EP) . | |
| 0767061A2 | 4/1997 | (EP) . | |
| 0769379A1 | 4/1997 | (EP) | B41J/2/16 |
| 0785072A2 | 7/1997 | (EP) . | |
| 0787588A2 | 8/1997 | (EP) . | |
| 0790129A2 | 8/1997 | (EP) . | |
| 0800921A2 | 10/1997 | (EP) . | |
| 63-53052 | 3/1988 | (JP) . | |
| WO97/48558A | 12/1997 | (WO) . | |

*Primary Examiner*—John Barlow
*Assistant Examiner*—Juanita Stephens
(74) *Attorney, Agent, or Firm*—Dennis G. Stenstrom

(57) ABSTRACT

In a hybrid multi-drop and multi-pass printing system, composite drops are formed from separate drops merging onto media and highlight regions are formed by using single drops to form a dot. Individual drops are nearly invisible and thus can form highlights with low graininess. As the density of the image increases, multi-drop dots are formed by merging two or more drops. Drops merging together on the media cover white space more efficiently, increase optical density without throughput loss and reduce ink ejection frequency. Multiple passes result in error hiding and improved ink/media interaction. An array of ink ejection elements forms a single printhead in a carriage which is passed along a scan axis perpendicular to the media in the advance direction so that the array path defines a swath area on the media surface. The ink ejection elements are energized during the initial passing step. Subsequent passages of the carriage along the carriage scan axis and energization of the ink ejection elements cause a predetermined number of ink droplets to be ejected onto the media surface at predetermined individual pixel locations.

28 Claims, 21 Drawing Sheets

U.S. PATENT DOCUMENTS

| | | | |
|---|---|---|---|
| 4,794,410 | 12/1988 | Taub et al. | 347/65 |
| 4,794,411 | 12/1988 | Taub et al. | 347/47 |
| 4,882,595 | 11/1989 | Trueba et al. | 347/85 |
| 4,963,882 * | 10/1990 | Hickman | 347/41 |
| 5,252,986 | 10/1993 | Takaoka et al. | 347/15 |
| 5,369,428 * | 11/1994 | Maze et al. | 347/37 |
| 5,469,198 * | 11/1995 | Kadonaga | 347/41 |
| 5,527,121 * | 6/1996 | Santon | 347/9 |
| 5,541,629 | 7/1996 | Saunders et al. | 347/12 |
| 5,604,519 | 2/1997 | Keefe et al. | 347/13 |
| 5,610,637 | 3/1997 | Sekiya et al. | 347/10 |
| 5,652,609 | 7/1997 | Scholler et al. | 347/54 |
| 5,657,060 | 8/1997 | Sekiya et al. | 347/15 |
| 5,677,716 * | 10/1997 | Cleveland | 347/37 |
| 5,729,257 | 3/1998 | Sekiya et al. | 347/9 |
| 5,870,112 * | 2/1999 | Kang et al. | 347/9 |
| 5,877,786 | 3/1999 | Sekiya et al. | 347/15 |

* cited by examiner 2 mil Flex　　　　　　　　1 mil Flex

US 6,193,347 B1

HYBRID MULTI-DROP/MULTI-PASS PRINTING SYSTEM

CROSS-REFERENCE TO RELATED APPLICATIONS

This application is a continuing patent application of U.S. patent application Ser. No. 08/960,927, filed Oct. 30, 1997, entitled "Multi-Drop Merge on Media Printing System" and U.S. patent application Ser. No. 08/796,835 filed Feb. 6, 1997, entitled "Fractional Dot Column Correction for Scan Axis Alignment During Printing now U.S. Pat. No. 5,923,344." This patent application is also related to U.S. patent application Ser. No. 08/960,928, filed Oct. 30, 1997, entitled "Apparatus for Generating Small Volume, High Velocity Ink Droplets in an Inkjet Printer"; U.S. patent application Ser. No. 08/960,945, filed Oct. 31, 1997, entitled "Apparatus and Method for Generating High Frequency Ink Ejection and Ink Chamber Refill). The foregoing commonly assigned patent applications are herein incorporated by reference.

FIELD OF THE INVENTION

The present invention generally relates to inkjet printers and more particularly to apparatus and methods for generating photographic quality images on a color inkjet printer.

BACKGROUND OF THE INVENTION

Thermal inkjet hardcopy devices such as printers, large format plotters/printers, facsimile machines and copiers have gained wide acceptance. These hardcopy devices are described by W. J. Lloyd and H. T. Taub in "Ink Jet Devices," Chapter 13 of *Output Hardcopy Devices* (Ed. R. C. Durbeck and S. Sherr, San Diego: Academic Press, 1988) and U.S. Pat. Nos. 4,490,728 and 4,313,684. The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994)], incorporated herein by reference. Inkjet hardcopy devices produce high quality print, are compact and portable, and print quickly and quietly because only ink strikes the paper.

An inkjet printer forms a printed image by printing a pattern of individual dots at particular locations of an array defined for the printing medium. The locations are conveniently visualized as being small dots in a rectilinear array. The locations are sometimes termed "dot locations", "dot positions", or "pixels". Thus, the printing operation can be viewed as the filling of a pattern of dot locations with dots of ink.

Inkjet hardcopy devices print dots by ejecting very small drops of ink onto the print medium and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

The typical inkjet printhead (i.e., the silicon substrate, structures built on the substrate, and connections to the substrate) uses liquid ink (i.e., dissolved colorants or pigments dispersed in a solvent). It has an array of precisely formed orifices or nozzles attached to a printhead substrate that incorporates an array of ink ejection chambers which receive liquid ink from the ink reservoir. Each chamber is located opposite the nozzle so ink can collect between it and the nozzle. The ejection of ink droplets is typically under the control of a microprocessor, the signals of which are conveyed by electrical traces to the ink ejection element. When electric printing pulses activate the ink ejection element, a small portion of the ink next to it vaporizes and ejects a drop of ink from the printhead. Properly-arranged nozzles form a dot matrix pattern. Properly sequencing the operation of each nozzle causes characters or images to be printed upon the paper as the printhead moves past the paper.

The ink cartridge containing the nozzles is moved repeatedly across the width of the medium to be printed upon. At each of a designated number of increments of this movement across the medium, each of the nozzles is caused either to eject ink or to refrain from ejecting ink according to the program output of the controlling microprocessor. Each completed movement across the medium can print a swath approximately as wide as the number of nozzles arranged in a column of the ink cartridge multiplied by the distance between nozzle centers. After each such completed movement or swath the medium is moved forward the width of the swath, and the ink cartridge begins the next swath. By proper selection and timing of the signals, the desired print is obtained on the medium.

In an inkjet printhead ink is fed from an ink reservoir integral to the printhead or an "off-axis" ink reservoir which feeds ink to the printhead via tubes connecting the printhead and reservoir. Ink is then fed to the various ink ejection chambers either through an elongated hole formed in the center of the bottom of the substrate, "center feed," or around the outer edges of the substrate, "edge feed." In center feed the ink then flows through a central slot in the substrate into a central manifold area formed in a barrier layer between the substrate and a nozzle member, then into a plurality of ink channels, and finally into the various ink ejection chambers. In edge feed ink from the ink reservoir flows around the outer edges of the substrate into the ink channels and finally into the ink ejection chambers. In either center feed or edge feed, the flow path from the ink reservoir and the manifold inherently provides restrictions on ink flow to the ink ejection chambers.

Color inkjet hardcopy devices commonly employ a plurality of print cartridges, usually two to four, mounted in the printer carriage to produce a full spectrum of colors. In a printer with four cartridges, each print cartridge can contain a different color ink, with the commonly used base colors being cyan, magenta, yellow, and black. In a printer with two cartridges, one cartridge can contain black ink with the other cartridge being a tri-compartment cartridge containing the base color cyan, magenta and yellow inks, or alternatively, two dual-compartment cartridges may be used to contain the four color inks. In addition, two tri-compartment cartridges may be used to contain six base color inks, for example, black, cyan, magenta, yellow, light cyan and light magenta. Further, other combinations can be employed depending on the number of different base color inks to be used.

The base colors are produced on the media by depositing a drop of the required color onto a dot location, while secondary or shaded colors are formed by depositing multiple drops of different base color inks onto the same or an adjacent dot location, with the overprinting of two or more base colors producing the secondary colors according to well established optical principles.

In color printing, the various colored dots produced by each of the print cartridges are selectively overlapped to create crisp images composed of virtually any color of the visible spectrum. To create a single dot on paper having a color which requires a blend of two or more of the colors provided by different print cartridges, the nozzle plates on each of the cartridges must be precisely aligned so that a dot ejected from a selected nozzle in one cartridge overlaps a dot ejected from a corresponding nozzle in another cartridge.

The print quality produced from an inkjet device is dependent upon the reliability of its ink ejection elements. A multi-pass print mode can partially mitigate the impact of the malfunctioning ink ejection elements on the print quality. The concept of printmodes is a useful and well-known technique of laying down in each pass of the printhead only a fraction of the total ink required in each section of the image, so that any areas left white in each pass are filled in by one or more later passes. This tends to control bleed, blocking and cockle by reducing the amount of liquid that is on the page at any given time.

The specific partial-inking pattern employed in each pass, and the way in which these different patterns add up to a single fully inked image, is known as a "printmode." Printmodes allow a trade-off between speed and image quality. For example, a printer's draft mode provides the user with readable text as quickly as possible. Presentation, also known as best mode, is slow but produces the highest image quality. Normal mode is a compromise between draft and presentation modes. Printmodes allow the user to choose between these trade-offs. It also allows the printer to control several factors during printing that influence image quality, including: 1) the amount of ink placed on the media per dot location, 2) the speed with which the ink is placed, and, 3) the number of passes required to complete the image. Providing different printmodes to allow placing ink drops in multiple swaths can help with hiding nozzle defects. Different printmodes are also employed depending on the media type.

One-pass mode operation is used for increased throughput on plain paper. Use of this mode on other papers will result in too large of dots on coated papers, and ink coalescence on polyester media. In a one-pass mode, all dots to be fired on a given row of dots are placed on the medium in one swath of the print head, and then the print medium is advanced into position for the next swath.

A two-pass printmode is a print pattern wherein one-half of the dots available for a given row of available dots per swath are printed on each pass of the printhead, so two passes are needed to complete the printing for a given row.

Similarly, a four-pass mode is a print pattern wherein one fourth of the dots for a given row are printed on each pass of the printhead and an eight-pass mode is a print pattern wherein one eighth of the dots for a given row are printed on each pass of the printhead. Multiple pass thermal ink-jet printing is described, for example, in commonly assigned U.S. Pat. Nos. 4,963,882 and 4,965,593. In general it is desirable to use the minimum number of passes per full swath area to complete the printing in order to maximize the printer throughput in such a way as to reduce undesirable visible printing artifacts.

The ability to achieve good tone scale is crucial to achieving photographic image quality. In the highlight region of the tone scale, nearly invisible dots and lack of graininess are required. Areas of solid fill require saturated colors, high optical density and no white space. Also, the ability to place more than one drop from a given printhead into a pixel is essential to achieving this photographic image quality. Another important attribute of an imaging system is high throughput.

Previous methods such as multi-pass printing described above put more than one drop from a given printhead in a pixel, but this is done on separate passes. The disadvantages of this approach are: (1) throughput is compromised because a separate pass is required for each drop placed from a given printhead onto a pixel, (2) in areas of high density printing, drops are put into every pixel on every pass which leads to dot coalescence which degrades image quality, and (3) it is an inefficient way to cover white space in the midtone regions of the tone scale where slight drop placement variations are required to fill in white space which is difficult when multiple drops are placed on a pixel in separate passes.

Another solution for achieving good tone scales is to use a six-ink printing system. This approach uses black ink, yellow ink, light cyan ink, dark cyan ink, light magenta ink and dark magenta ink. Good image quality is achieved in highlight regions by using only the yellow, light cyan and light magenta inks. The black, dark cyan and dark magenta inks are used in more saturated areas of the image. The disadvantages of this system are (1) the complexity of having a six-ink system (more inks, more complicated color maps and product cost and size and (2) transitions that degrade image quality are observed in the tone scale when the dark cyan and dark magenta, which are highly visible, are first used.

Another approach to form different dot sizes is to use multiple drop volumes on the same printhead (See, U.S. Pat. No. 4,746,935). The primary disadvantage of this approach is the need for multiple drop generators which increases cost and complexity.

Even when using the above described methods and apparatus, the creation of crisp and vibrant images with accurate tone equal to those produced by conventional silver halide photography has not been achieved.

Due to the increasing use of digital cameras to produce digital images and the use of scanners to input conventional photographs into personal computers, the demand has rapidly increased for printers which can produce photographic quality prints from these images. Accordingly, there is a need for printers which can produce photographic quality prints.

SUMMARY OF THE INVENTION

The hybrid multi-drop and multi-pass printing of the present invention combines the best aspects of multi-drop merge on media printing and multi-pass printing. In multi-drop printing individual drops merge on the media to form a composite drop of the individual drops. This printing method is an efficient way to create high quality images. Highlight regions are formed by using single drops to form a dot. Individual drops are nearly invisible and can be used to form highlights with low graininess. As the density of the image increases, multi-drop dots are formed with two or more drops merging on the media. By allowing drops to merge together on media in a given pass, white space is more efficiently covered than with previous approaches. For hybrid multi-drop and multi-pass printing of the present invention, the advantages of multi-drop merge on media printing are retained while optical density is increased with no loss of throughput while enabling printing at reduced ink ejection frequency. In addition, multiple passes can be used for error hiding and also to improve ink/media interaction.

The method of printing on a media of the present invention includes mounting an array of ink ejection elements for a single printhead in a carriage, where the array of ink ejection elements defines a swath width. Initially passing the carriage along a carriage scan axis perpendicular to a media advance direction, so that a path of the array of ink ejection elements defines a swath area on the media surface and initially energizing ink ejection elements during said initial passing step thereby causing a predetermined number of initial ink droplets to be ejected onto the media surface at a predetermined individual pixel locations on the media. Subsequently passing the carriage along the carriage scan axis and subsequently energizing ink ejection elements during said subsequent passing step thereby causing a predetermined number of subsequent ink droplets to be ejected onto the media surface at the predetermined individual pixel location on the media. The above steps are performed while maintaining the number of initial and subsequent ejected ink drops as subtantially separate drops until the ink drops merge upon impact with the media.

DETAILED DESCRIPTION OF THE PREFERRED EMBODIMENTS

While the present invention will be described below in the context of an off-axis printer having an external ink source, it should be apparent that the present invention is also useful in an inkjet printer which uses inkjet print cartridges having an ink reservoir integral with the print cartridge.

Figure 1:
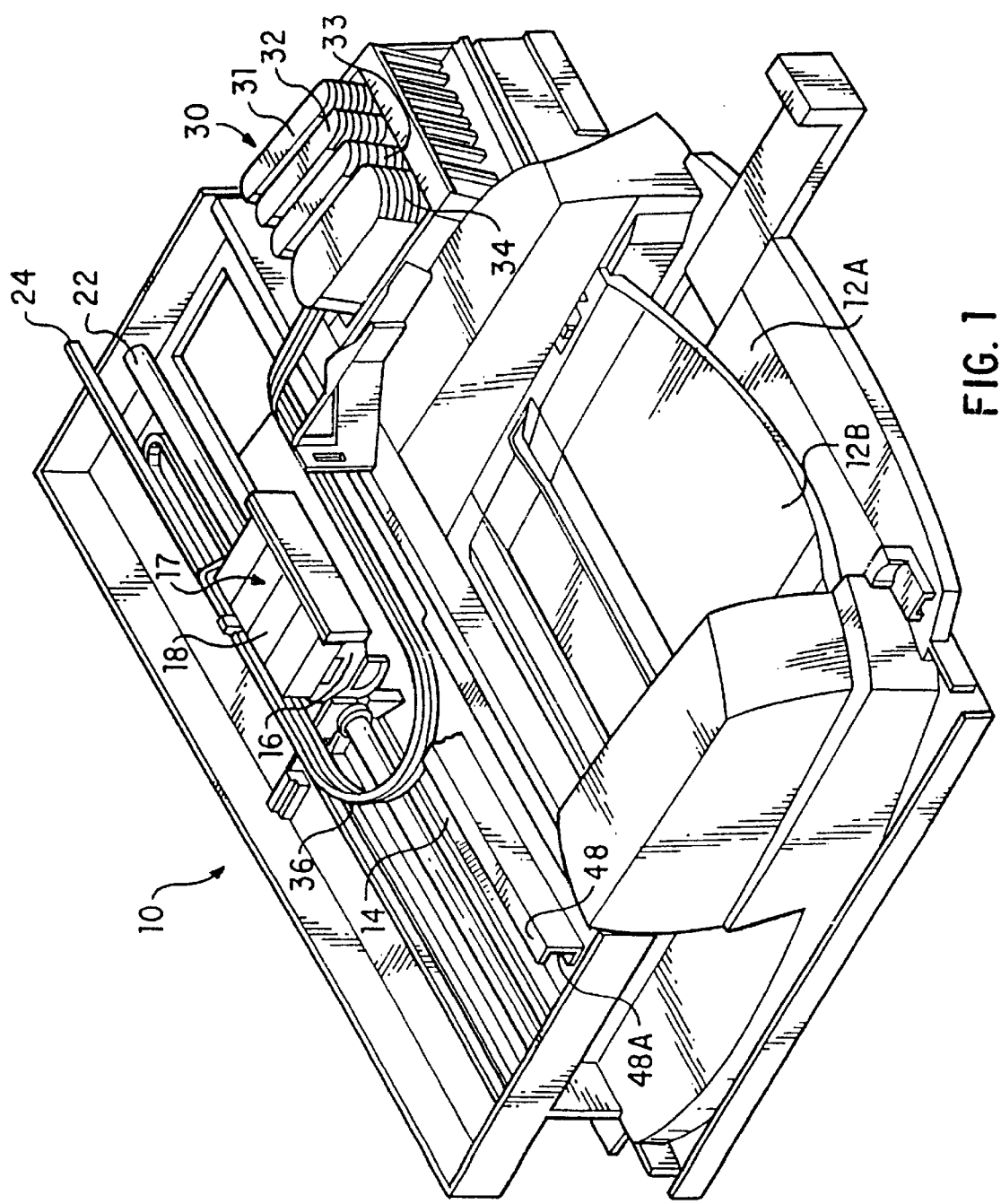
FIG. 1 is a perspective view of one embodiment of an inkjet printer incorporating the present invention.

FIG. 1 is a perspective view of one embodiment of an inkjet printer 10 suitable for utilizing the present invention, with its cover removed. Generally, printer 10 includes a tray 12 for holding virgin paper. When a printing operation is initiated, a sheet of paper from tray 12A is fed into printer 10 using a sheet feeder, then brought around in a U direction to now travel in the opposite direction toward tray 12B. The sheet is stopped in a print zone 14, and a scanning carriage 16, supporting one or more print cartridges 18, is then scanned across the sheet for printing a swath of ink thereon. The printing may occur while the carriage is scanning in either directional. This is referred to as bi-directional printing. After a single scan or multiple scans, the sheet is then incrementally shifted using a conventional stepper motor and feed rollers to a next position within the print zone 14, and carriage 16 again scans across the sheet for printing a next swath of ink. When the printing on the sheet is complete, the sheet is forwarded to a position above tray 12B, held in that position to ensure the ink is dry, and then released.

The carriage 16 scanning mechanism may be conventional and generally includes a slide rod 22, along which carriage 16 slides, a flexible circuit (not shown in FIG. 1) for transmitting electrical signals from the printer's microprocessor to the carriage 16 and print cartridges 18 and a coded strip 24 which is optically detected by a photo detector in carriage 16 for precisely positioning carriage 16. A stepper motor (not shown), connected to carriage 16 using a conventional drive belt and pulley arrangement, is used for transporting carriage 16 across print zone 14.

The features of inkjet printer 10 include an ink delivery system for providing ink to the print cartridges 18 and ultimately to the ink ejection chambers in the printheads from an off-axis ink supply station 30 containing replaceable ink supply cartridges 31, 32, 33, and 34, which may be pressurized or at atmospheric pressure. For color printers, there will typically be a separate ink supply cartridge for black ink, yellow ink, magenta ink, and cyan ink. Four tubes 36 carry ink from the four replaceable ink supply cartridges 31–34 to the print cartridges 18.

Figure 2:
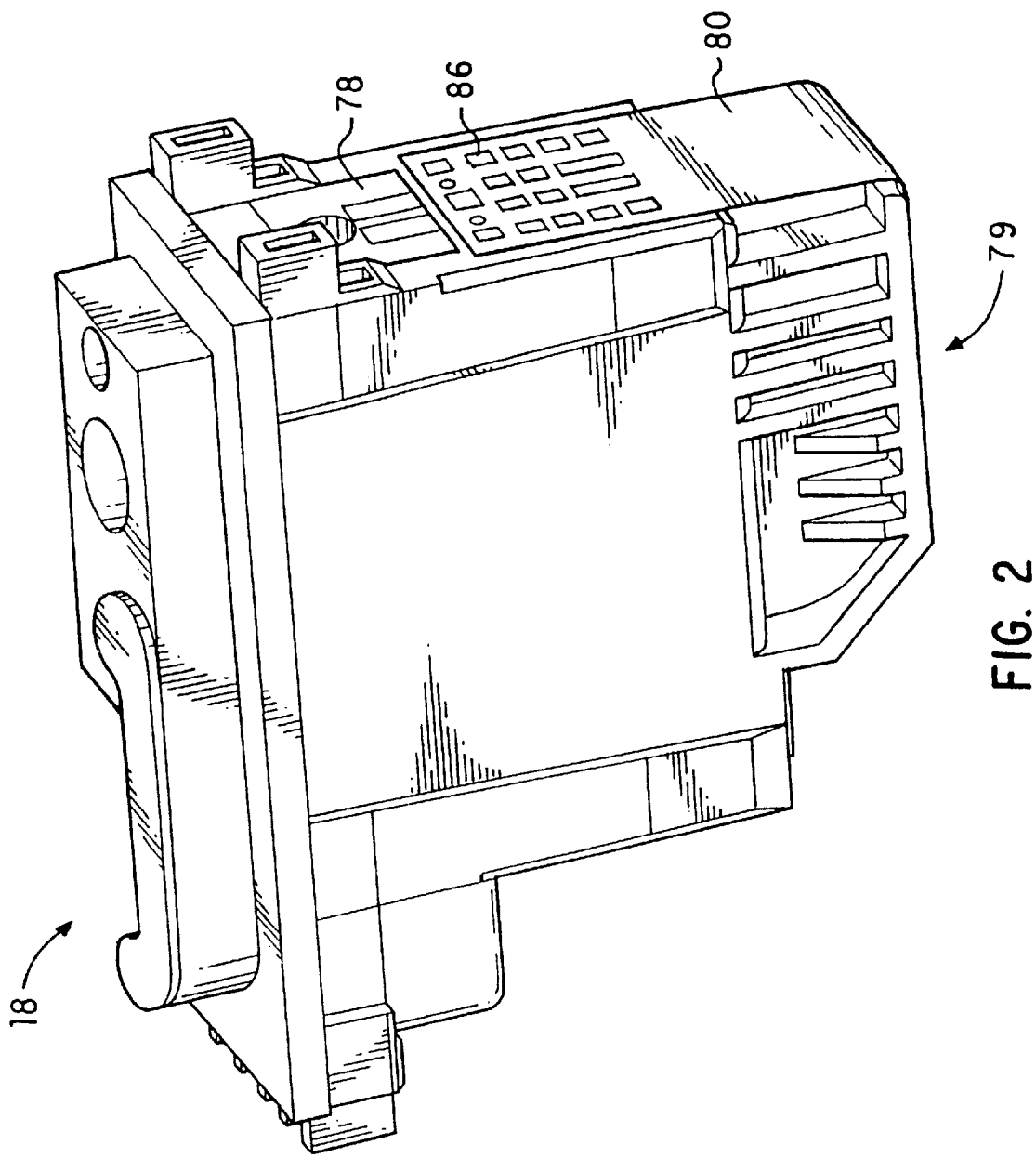
FIG. 2 is a top perspective view of a single print.
Figure 3:
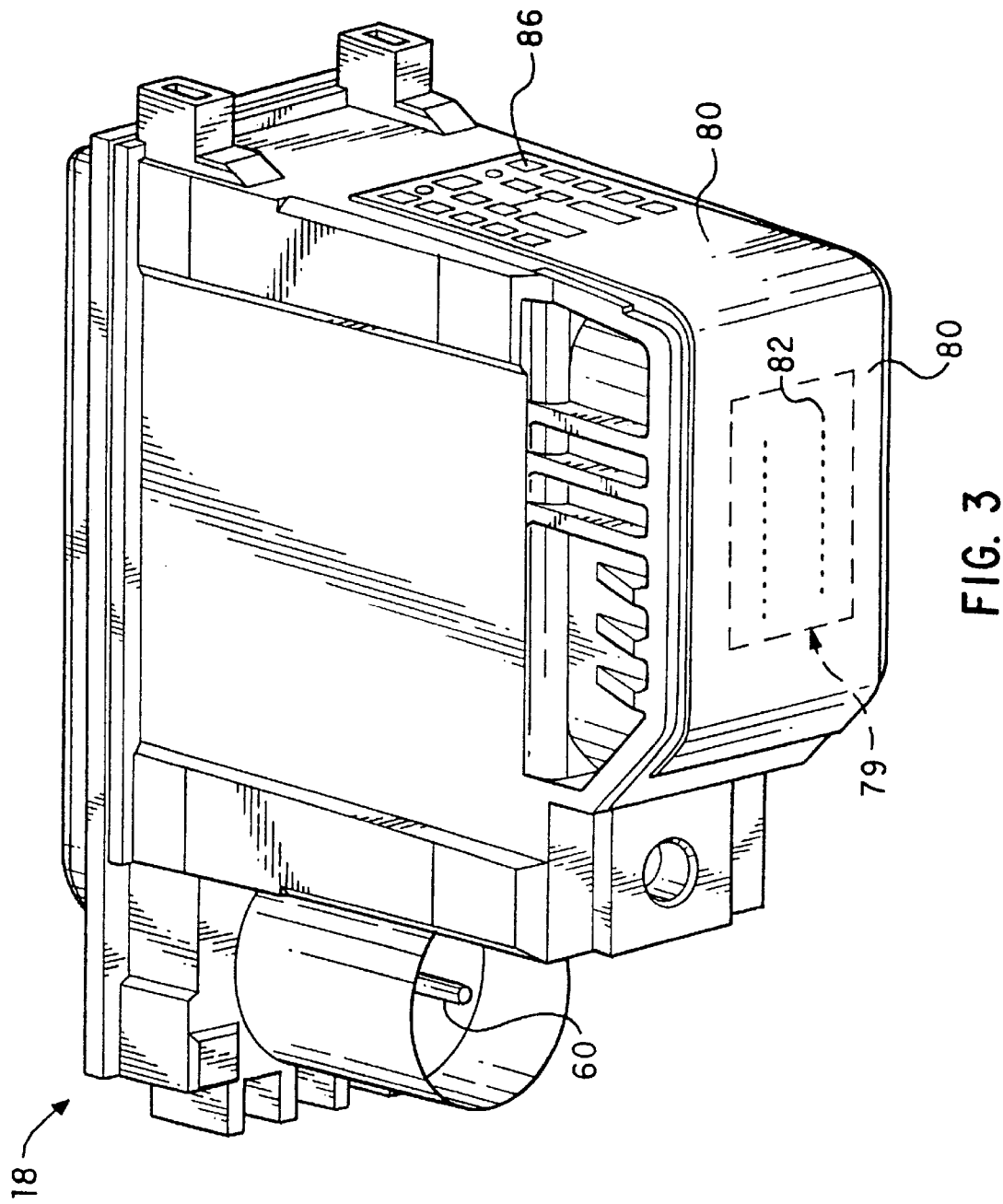
FIG. 3 is a bottom perspective view a single print cartridge.

Referring to FIGS. 2 and 3, a flexible tape 80 containing contact pads 86 leading to electrodes 87 (not shown) on printhead substrate 88 is secured to print cartridge 18. These contact pads 86 align with and electrically contact electrodes (not shown) on carriage 16. An integrated circuit chip or memory element 78 provides feedback to the printer regarding certain parameters such as nozzle trajectories and drop volumes of print cartridge 18. Tape 80 has a nozzle array, or nozzle member, 79 consisting of two rows of nozzles 82 which are laser ablated through tape 80. An ink fill hole 81 is used to initially fill print cartridge 18 with ink. A stopper (not shown) is intended to permanently seal hole 81 after the initial filling.

A regulator valve (not shown) within print cartridges 18 regulates pressure by opening and closing an inlet hole to an ink chamber internal to print cartridges 18. When the regulator valve is opened, hollow needle 60 is in fluid communication with an ink chamber (not shown) internal to the cartridge 18 and the off-axis ink supply. When in use in the printer 10, the print cartridges 18 are in fluid communication with an off-carriage ink supply 31–34 that is releasably mounted in an ink supply station 30.

Figure 4:
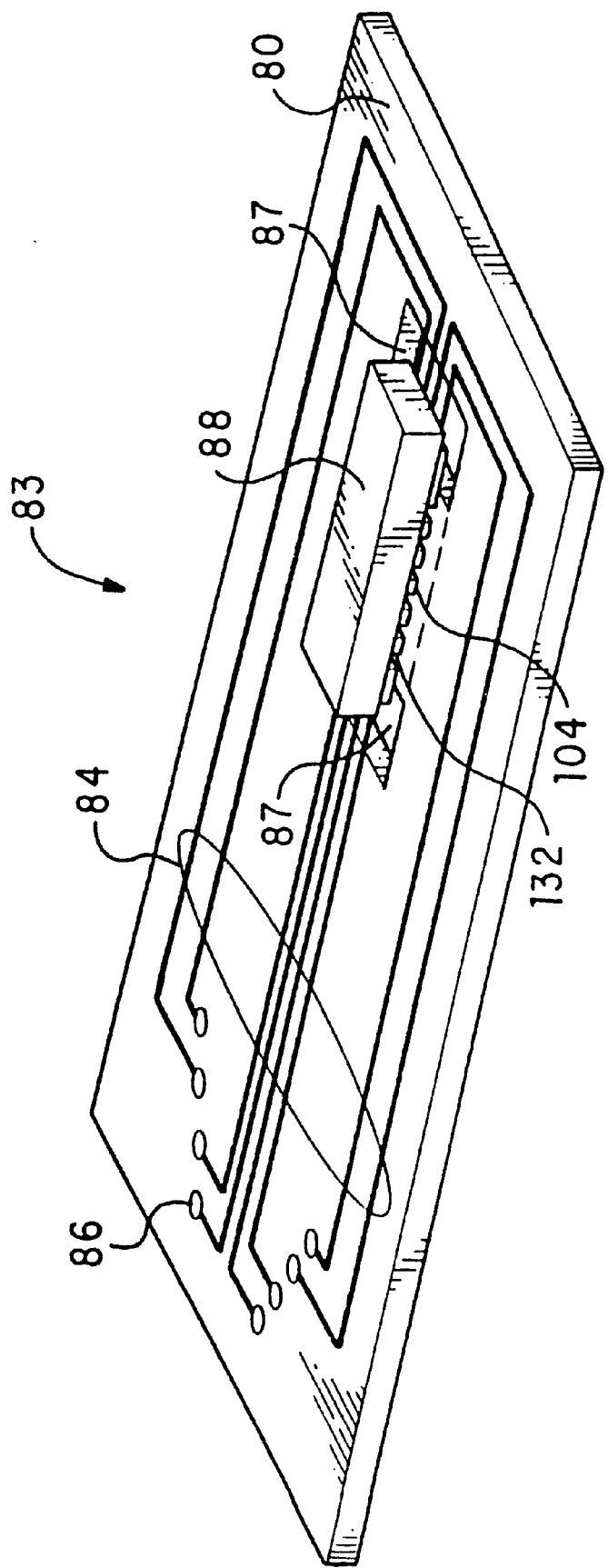
FIG. 4 is a schematic perspective view of the back side of a simplified printhead assembly.

Referring to FIGS. 3 and 4, printhead assembly 83 is preferably a flexible polymer tape 80 having a nozzle member array 79 containing nozzles 82 formed therein by laser ablation. Conductors 84 are formed on the back of tape 80 and terminate in contact pads 86 for contacting electrical contacts on carriage 16. The other ends of conductors 84 are bonded to electrodes 87 of substrate 88 on which are formed the various ink ejection chambers and ink ejection elements. The ink ejection elements may be heater ink ejection elements or piezoelectric elements.

A demultiplexer (not shown) may be formed on substrate 88 for demultiplexing the incoming multiplexed signals applied to the electrodes 87 and distributing the address and primitive signals to the various ink ejection elements 96 to reduce the number of contact pads 86 required. The incoming multiplexed signals include address line and primitive firing signals. The demultiplexer enables the use of fewer contact pads 86, and thus electrodes 87, than ink ejection elements 96. The demultiplexer may be any decoder for decoding encoded signals applied to the electrodes 87. The demultiplexer has input leads (not shown for simplicity) connected to the electrodes 87 and has output leads (not shown) connected to the various ink ejection elements 96. The demultiplexer demultiplexes the incoming electrical signals applied to contact pads 86 and selectively energizes the various ink ejection elements 96 to eject droplets of ink from nozzles 82 as nozzle array 79 scans across the print zone. Further details regarding multiplexing are provided in U.S. Pat. No. 5,541,269, issued Jul. 30, 1996, entitled "Printhead with Reduced Interconnections to a Printer," which is herein incorporated by reference.

Preferably, an integrated circuit logic using CMOS technology should be placed on substrate 88 in place of the demultiplexer in order to decode more complex incoming data signals than just multiplexed address signals and primitive signals, thus further reduce the number of contact pads 86 required. The incoming data signals are decoded in the integrated logic circuits on the printhead into address line and primitive firing signals. Performing this operation in the integrated logic circuits on the printhead increases the signal processing speed and the burst frequency to be discussed below.

Also formed on the surface of the substrate 88 using conventional photo lithographic techniques is the barrier layer 104, which may be a layer of photo resist or some other polymer, in which is formed the ink ejection chambers 94 and ink channels 132.

Figure 5:
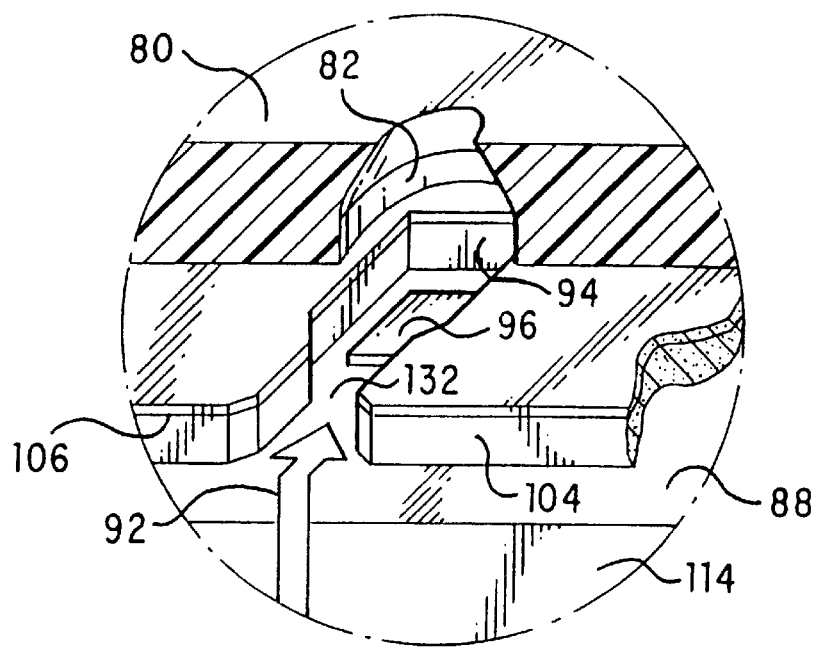
FIG. 5 is a top perspective view, partially cut away, of a portion of the TAB head assembly showing the relationship of an orifice with respect to a ink ejection chamber, a heater ink ejection element, and an edge of the substrate.

FIG. 5 is an enlarged view of a single ink ejection chamber 94, ink ejection elements 96, and frustum shaped orifice 82 after the substrate structure is secured to the back of the flexible circuit 80 via the thin adhesive layer 106. A side edge of the substrate 88 is shown as edge 114. In operation, ink flows from the ink reservoir 12 around the side edge 114 of the substrate 88, and into the ink channel 132 and associated ink ejection chamber 94, as shown by the arrow 92. Upon energization of the ink ejection element 96, a thin layer of the adjacent ink is superheated, causing ink ejection and, consequently, causing a droplet of ink to be ejected through the orifice 82. The ink ejection chamber 94 is then refilled by capillary action.

Figure 6:
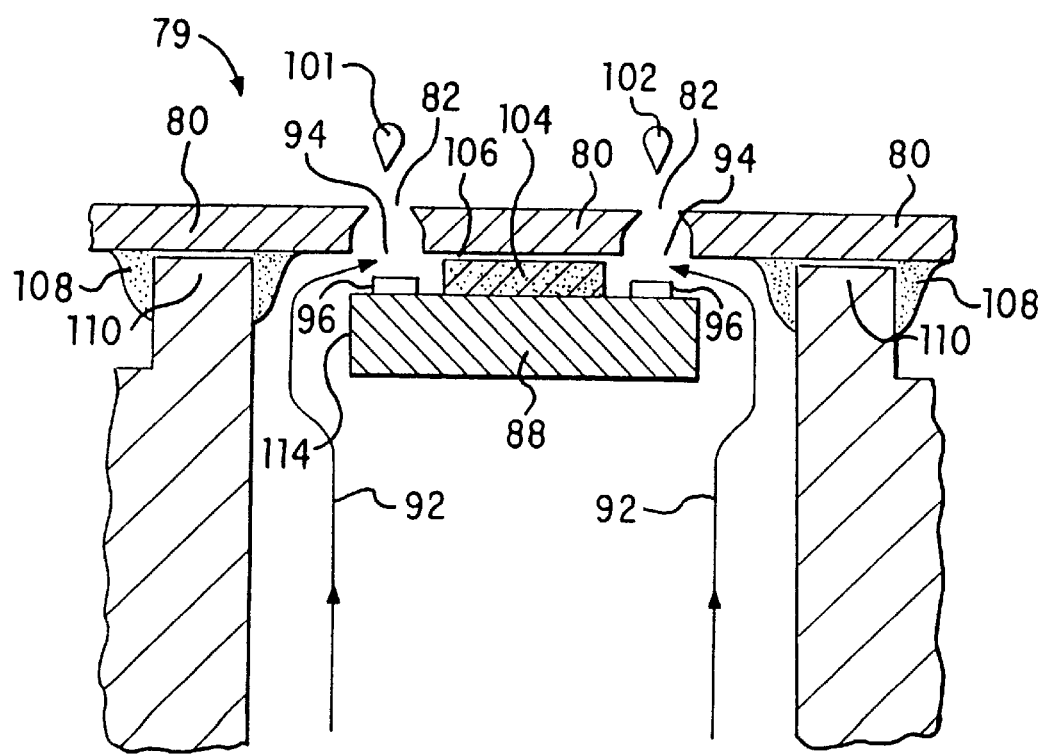
FIG. 6 is a cross-sectional view of the printhead assembly showing the flow of ink to the ink ejection chambers in the printhead.

FIG. 6 illustrates the flow of ink 92 from the ink chamber 61 within print cartridge 18 to ink ejection chambers 94. Energization of the ink ejection elements 96 cause a droplet of ink 101, 102 to be ejected through the associated nozzles 82. A photo resist barrier layer 104 defines the ink channels and chambers, and an adhesive layer 106 affixes the flexible tape 80 to barrier layer 104. Another adhesive 108 provides a seal between tape 80 and the plastic print cartridge body 110.

The assembly of the printhead may be similar to that described in U.S. Pat. No. 5,278,584, by Brian Keefe, et al., entitled "Ink Delivery System for an Inkjet printhead," assigned to the present assignee and incorporated herein by reference.

The frequency limit of a thermal inkjet pen is limited by resistance in the flow of ink to the nozzle. However, some resistance in ink flow is necessary to damp meniscus oscillation, but too much resistance limits the upper frequency at which a print cartridge can operate. The inlet channel geometry, barrier thickness, shelf length or inlet channel length which is the distance between the ink ejection elements and the edge of the substrate, must be properly sized to enable fast refill of ink into the ink chamber 94 while also minimizing sensitivity to manufacturing variations. As a consequence, the fluid impedance is reduced, resulting in a more uniform frequency response for all nozzles. An additional component to the fluid impedance is the entrance to the ink ejection chamber 94. The entrance comprises a thin region between the nozzle 82 and the substrate 88 and its height is essentially a function of the thickness of the barrier layer 104. This region has high fluid impedance, since its height is small.

To increase resolution and print quality, the printhead nozzles must be placed closer together. This requires that both heater ink ejection elements and the associated orifices be placed closer together. To increase printer throughput, the firing frequency of the ink ejection elements must be increased. When firing the ink ejection elements at high frequencies, conventional ink channel barrier designs either do not allow the ink ejection chambers to adequately refill or allow extreme blowback or catastrophic overshoot and puddling on the exterior of the nozzle member. Also, the closer spacing of the ink ejection elements create space problems and restricted possible barrier solutions due to manufacturing concerns.

Figure 7:
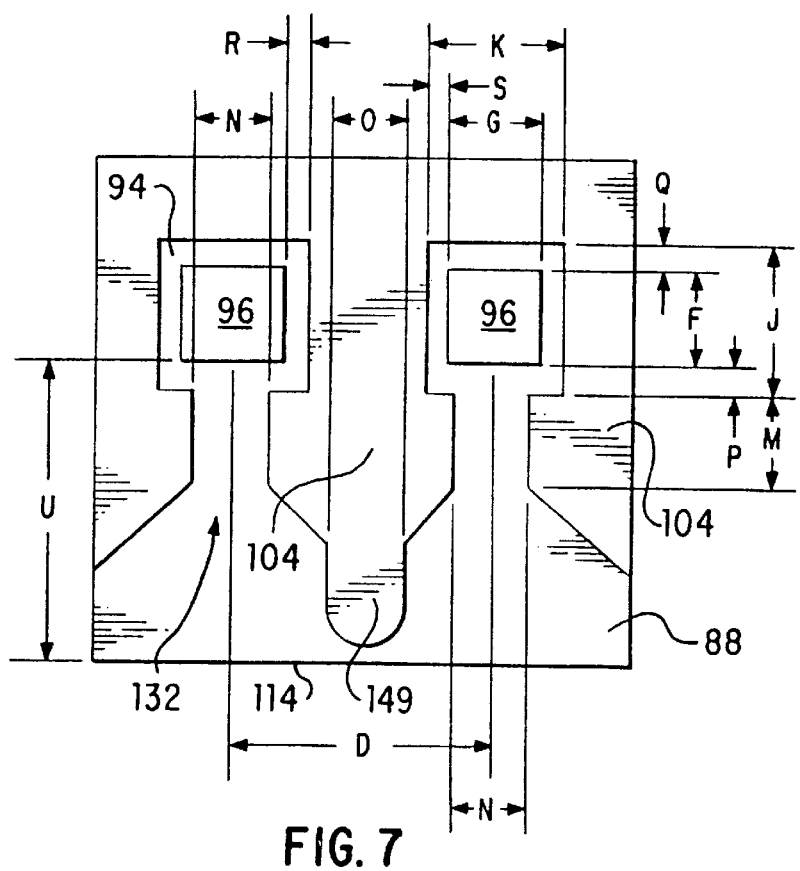
FIG. 7 is a top plan view of a magnified portion of a printhead showing two ink ejection chambers and the associated barrier structure and ink ejection elements.

FIGS. 7 an 8 show a printhead architecture that is advantageous when the printing of very high dot density, low drop volume, high drop velocity and high frequency ink ejection is required. However, at high dot densities and at high ink ejection rates cross-talk between neighboring ejection chambers becomes a serious problem. During the ejection of a single drop, initiated by an ink ejection element displaces ink out of nozzle 82 in the form of a drop. At the same time, ink is also displaced back into the ink channel 132. The quantity of ink so displaced is often described as "blowback volume." The ratio of ejected volume to blowback volume is an indication of ejection efficiency. In addition to representing an inertial impediment to refill, blowback volume causes displacements in the menisci of neighboring nozzles. When these neighboring nozzles are fired, such displacements of their menisci cause deviations in drop volume from the nominally equilibrated situation resulting in non-uniform dots being printed. An embodiment of the present invention shown in the printhead assembly architecture of FIG. 7 is designed to minimize such cross-talk effects.

The ink ejection chambers 94 and ink channels 132 are shown formed in barrier layer 104. Ink channels 132 provide an ink path between the source of ink and the ink ejection chambers 94. The flow of ink into the ink channels 132 and into the ink ejection chambers 94 is via ink flow around the side edges 114 of the substrate 88 and into the ink channels 132. The ink ejection chambers 94 and ink channels 132 may be formed in the barrier layer 104 using conventional photo lithographic techniques. The barrier layer 104 may comprise any high quality photo resist, such as Vacrel™ or Parad™.

Ink ejection elements 96 are formed on the surface of the silicon substrate 88. As previously mentioned, ink ejection elements 96 may be well-known piezoelectric pump-type ink ejection elements or any other conventional ink ejection elements. Peninsulas 149 extending out to the edge of the substrate provide fluidic isolation of the ink ejection chambers 94 from each other to prevent cross-talk. The pitch D of the ink ejection chambers 94, shown below in Table II, provides for 600 dots per inch (dpi) printing using two rows of ink ejection chambers 94.

While the ink ejection elements and ink ejection chambers are shown as essentially being square in FIG. 7, it will be appreciated that they can be rectangular or circular in shape.

Figure 8:
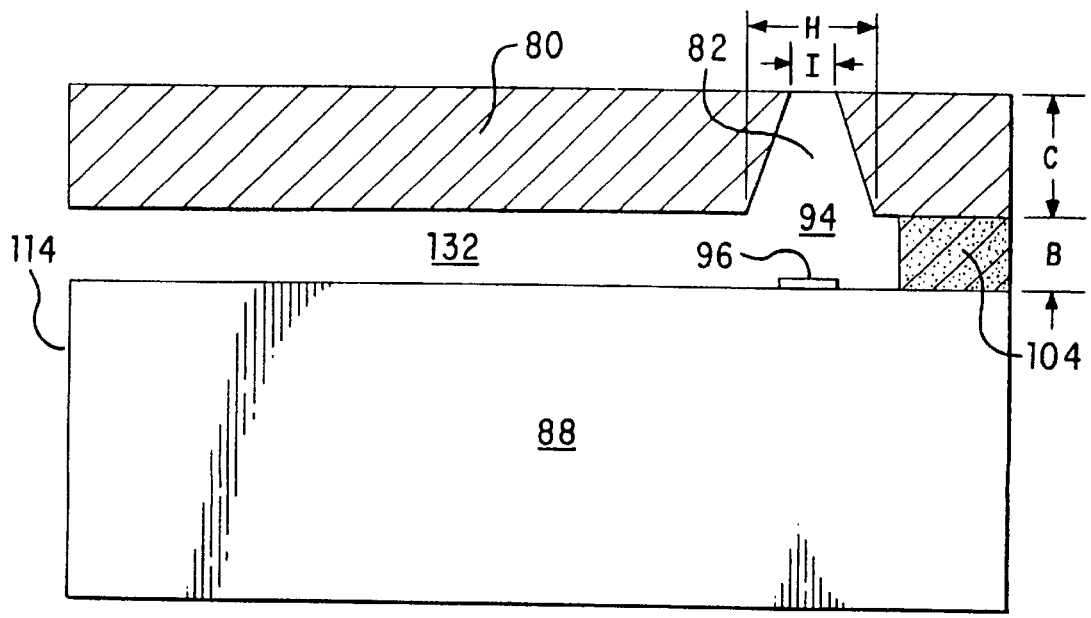
FIG. 8 is an elevational cross-sectional view of the printhead assembly of FIG. 7 showing the thickness of the barrier layer and the nozzle member.

The definition of the dimensions of the various elements shown in FIGS. 7 and 8 are provided in Table I.

TABLE I

DEFINITIONS FOR DIMENSIONS OF PRINTHEAD ARCHITECTURE

| Dimension | Definition |
|---|---|
| B | Barrier Thickness |
| C | Nozzle Member Thickness |
| D | Orifice/Ink Ejection Element Pitch |
| F | Ink Ejection Element Length |
| G | Ink Ejection Element Width |
| H | Nozzle Entrance Diameter |
| I | Nozzle Exit Diameter |
| J | Chamber Length |
| K | Chamber Width |
| M | Channel Length |
| N | Channel Width |
| O | Barrier Peninsula Width |
| P | Entrance Chamber Gap |
| Q | Back Wall Chamber Gap |
| R | Side Chamber Gap |
| S | Side Chamber Gap |
| U | Inlet Channel Length |

Table II lists the nominal values, as well as their preferred ranges, of some of the dimensions of the printhead assembly structure of FIGS. 7 and 8. It should be understood that the preferred ranges and nominal values of an actual embodiment will depend upon the intended operating environment of the printhead assembly, including the type of ink used, the operating temperature, the printing speed, and the dot density.

TABLE II

INK CHAMBER DIMENSIONS IN MICRONS

| Dimension | Minimum | Nominal | Maximum |
|---|---|---|---|
| B | 8 | 14 | 20 |
| C | 15 | 25.4 | 39 |
| D |  | 84.7 |  |
| F | 11 | 17 | 23 |
| G | 11 | 17 | 23 |
| H | 24 | 34 | 44 |
| I | 8 | 12 | 14 |
| J | 20 | 27 | 38 |
| K | 20 | 27 | 38 |
| M | 15 | 30 | 45 |
| N | 12 | 20 | 30 |
| O | 10 | 23 | 40 |
| P | 2 | 6 | 12 |
| Q | 2 | 6 | 9 |
| R | 2 | 5 | 9 |
| S | 2 | 5 | 9 |
| U | 70 | 160 | 220 |

Previous FIGS. 7 and 8 and Table II show the design features and dimensions characteristics of printheads which can be used to successfully print photographic quality images at a very high drop ejection frequency and a constant small drop volume of less than 10 picoliters. The printhead architecture design is a key factor of the present invention. Flex circuit 80 thickness has to be matched to the dimensions of the ink channel 132, ejection chamber 94, ink ejection element 96, barrier 104 thickness and design, as well as the ink formulation. Simply reducing the horizontal dimensions F, G, H, I, J and K of the ink chamber 94 reduces the volume of the ejected drops, but creates a low drop ejection velocity. Referring to Table III, a standard 2-mil (50.8 microns) flex circuit 80 and a nozzle outlet diameter of 14 microns creates a long nozzle with a C/I of approximately 4.0. Consequently, drops are ejected at a velocity of approximately 3.5–7.5 meters/second which is too low. These low velocity drops can lead to nozzle plugs, mis-direction, and thermal inefficiency.

TABLE III

| Nozzle Thickness C | Barrier Thickness B | Orifice Diameter I | Resistor Size F, G | C/I | Drop Volume Picoliters | Drop Velocity meters/sec |
|---|---|---|---|---|---|---|
| 50.8 | 14 | 14 | 17 | 3.6 | 3.5 | 3.0 |
| 50.8 | 14 | 14 | 21 | 3.6 | 5.9 | 7.5 |
| 25.4 | 14 | 12 | 17 | 2.1 | 5.3 | 14.0 |

Referring to again to Table III, the ink ejection chamber 94 can eject small drops in high frequency bursts when the nozzle 82 thickness is matched to ink ejection element 96 size, barrier 104 thickness, and nozzle 82 exit diameter. As shown in Table III, drop velocity is nearly doubled when the nozzle 82 or flex circuit 80 thickness is reduced from 50.8 microns to 25.4 microns. The surprising result of using a 25.4 micron flex circuit 80 or nozzle 82 leads to a robust, reliable design that is thermally efficient.

The present invention has several advantages over previous printing systems and methods. The drop volume and velocity of the individual drops in high frequency bursts in the range of 15 to 60 kHz remain nearly constant at approximately 3–5 picoliters (pl) and velocities greater than 10 meters per second (m/s), respectively. In previous printhead architectures the first drop ejected from the ink ejection chamber 94 was the largest and slowest drop. Successive drops after the first ejected drop were significantly lower in volume. However, to create a smooth gray level ramp, it is desirable to have precisely the opposite effect, i.e., a smaller, nearly imperceptible first drop, followed by successive drops of larger cumulative volume. In addition, drops with low velocity are undesirable because they cannot clear mild nozzle plugs and are easily misdirected by puddles on the nozzle member surface.

Another advantage of the present invention is that the design of the ink ejection chamber and ink inlet channel allows for high frequency ink refill of the ink ejection chamber. The ink ejection chamber refill frequency must at least equal to the ink ejection frequencies of 15 to 60 kHz.

Other advantages of the present invention are: (1) individual drops remain nearly constant in volume for bursts of one to eight drops at high frequencies (this allows smooth gray level ramps, which is a fundamental requirement in high quality imaging) (2) does not require ink viscosity and dynamic surface tension that are incompatible with imaging media, light fastness, water fastness, and dry time goals; (3) does not require multiple drops to merge in flight to form a single larger drop; and (4) does not require varying pulse widths and timing between individual drops.

Figure 9:
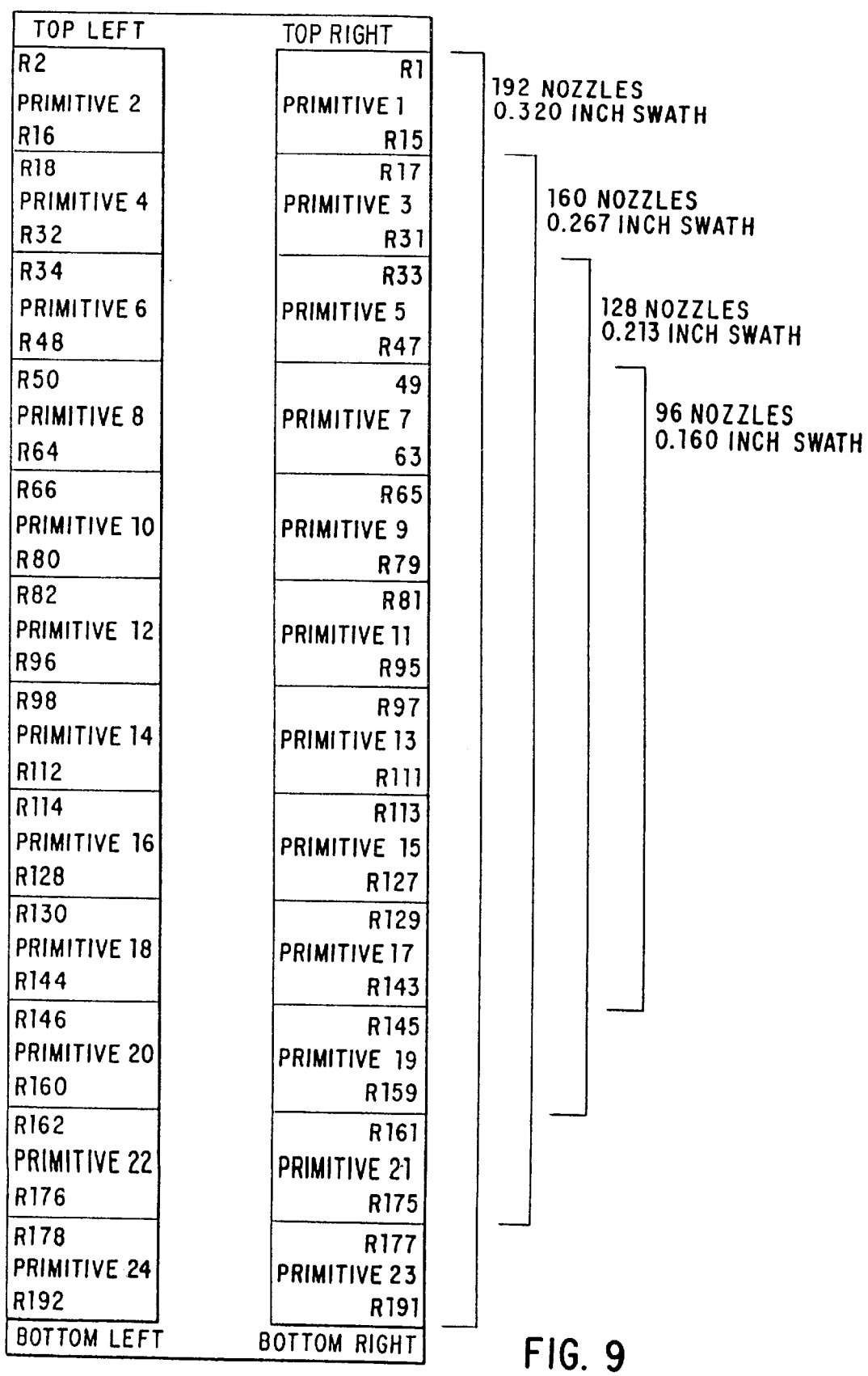
FIG. 9 is a top plan schematic view of one arrangement of primitives and the associated ink ejection elements and nozzles on a printhead, with the long axis of the array perpendicular to the scan direction of the printhead.
Figure 10:
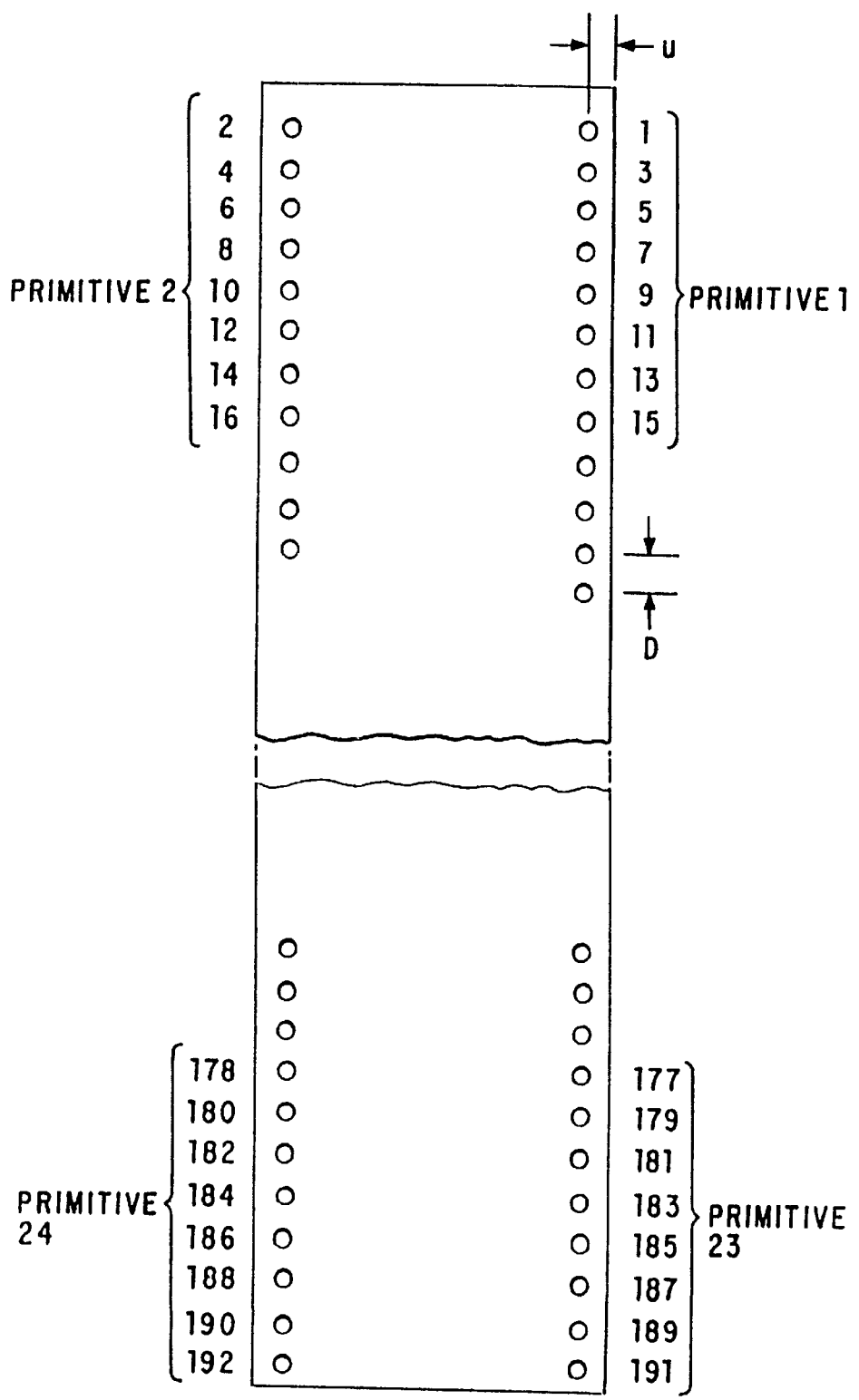
FIG. 10 is a top plan view of a printhead nozzle array with a straight line of nozzles, with the array perpendicular to the scan direction of the printhead.

Referring to FIGS. 9 and 10, the orifices 82 and ink ejection elements 96 in the nozzle member 79 of the printhead assembly are generally arranged in two major columns. The 192 orifices 82 and ink ejection elements 96 are also arranged in adjacent groupings of eight to form 24 primitives. Each ink ejection element can be uniquely identified by an address line and a primitive line. When using all 192 nozzles the swath width in the paper axis direction is 0.320 inches. Other modes of operation allow use of 160 nozzles in 20 primitives and a swath width of 0.267 inches, 128 nozzles in 16 primitives and a swath width of 0.213 inches and 96 nozzles in 12 primitives and a swath width of 0.160 inches. The use of these alternative modes of operation allow for higher ejection frequencies. For clarity of understanding, the orifices 82 and ink ejection elements 96 and the primitives are conventionally assigned a number as shown in FIG. 9. Starting at the top right as the printhead assembly as viewed from the external surface of the nozzle member 79 and ending in the lower left, the odd numbers are arranged in one column and even numbers are arranged in the second column. Of course, other numbering conventions may be followed, but the description of the firing order of the orifices 82 and ink ejection elements 96 associated with this numbering system has advantages. The orifices/ink ejection elements in each column are spaced $\frac{1}{300}$ of an inch apart in the long direction of the nozzle member. The orifices and ink ejection elements in one column are offset from the orifice/ ink ejection elements in the other column in the long direction of the nozzle member by $\frac{1}{600}$ of an inch, thus, providing 600 dots per inch (dpi) printing resolution when printing with both columns of nozzles.

For a number of reasons, all of the nozzles 82 cannot be energized simultaneously. That is, two adjacent nozzles are energized at slightly different times. The objective is to obtain a rectangular array of dots printed on the print medium. However, if the timing of two nozzles is off (by the normal delay), then a placement error of v*t will occur, where v is the scan velocity and t is the delay between firing two adjacent nozzles. If v*t is equal to an integral number of dot spacings, then that can be corrected by firing an extra initial dot for the "late" nozzle. However, v*t is normally some fraction of the dot spacing. There are several methods for solving this timing problem.

One solution to the timing problem, is to rotate the printhead slightly, as described more fully below. This architecture allows a plurality of ink ejection elements 96 to be all placed parallel to and at substantially the same distance from the edge 114 of the substrate 88. Accordingly, the shelf length, or inlet channel length U, is the same for all ink injection elements. This means the refill time for all ink ejection chambers is approximately the same.

The rotational angle ω of the substrate 88 is equal to the angle ω defined by the nozzle stagger. If the nozzle spacing is D, then the sine of the angle ω is equal to (v*t)/D. The angle of the cartridge rotation is the angle ω, where ω is arcsine (v*t)/D.

There are at least two ways to provide this rotation. One is to rotate the die 88 on the print cartridge 18. This has the disadvantage that a special printhead assembly line must be provided to manufacture a cartridge with a rotated die. An easier method to implement is simply to rotate the entire cartridge 18 by reconfiguring the carriage 16 to hold the print cartridges 17 in the proper angular orientation with the cartridges 17 rotated about an axis of rotation from the side of the carriage 16 equal to the angle ω.

Another solution to the timing problem is to provide a small offset or stagger between ink ejection chambers 94 within a primitive. The orifices 82, while generally aligned in two major columns as described, are further arranged in an offset or staggered pattern within each column and within each primitive. Within a single row or column of ink ejection elements, a small offset is provided between ink ejection elements. The stagger distance D between two nozzles is equal to v*t. This small offset allows adjacent ink ejection elements 96 to be energized at slightly different times when the printhead assembly is scanning across the recording medium. There are different offset locations, one for each of the address lines discussed below. This stagger helps to minimize current/power requirements associated with the firing ink ejection elements by energizing the ink ejection elements at different times. Thus, although the ink ejection elements are energized at different times, the offset allows the ejected ink drops from different nozzles to be placed in the same horizontal position on the print media. However, with this offset or stagger, the inlet channel length, U, is not the same for all ink injection elements. This means the refill time for all ink ejection chambers is also not the same.

Further details on the above-described methods are provided in U.S. patent application, Ser. No. 08/608,376, filed Feb. 28, 1996, entitled "Reliable High Performance Drop Generator For an Inkjet Printhead," which is herein incorporated by reference.

The present invention provides an improved method for solving the timing problem by providing burst ejection frequencies which are much greater than the base frequency required by the velocity of the printer carriage and the dot or pixel spacing. As discussed in detail below, it is very important for high quality printing using multi-drop merge on media printing that each of the drops ejected in the burst of pulses have the same drop volume. The most important factor in obtaining this equal drop volume for each of the drops is high speed ink refill of the ejection chamber and minimal chamber-to-chamber variations in ink refill speed for the different ink ejection chambers 94. This high speed refill with minimal variations can best be accomplished by having a straight line of ink ejection elements/nozzles with no stagger. In addition, it is not necessary to rotate the substrate as discussed above, because the stagger error is very small due to the rapid cycle time through the address lines. This high firing frequency also allows the placement of multiple drops on a pixel and adjustment of time of ejection to correct for dot placement errors. Further details are provided in U.S. patent application Ser. No. 08/796,835, filed Feb. 6, 1997, entitled "Fractional Dot Column Correction for Scan Axis Alignment During Printing," which is herein incorporated by reference.

Figure 11:
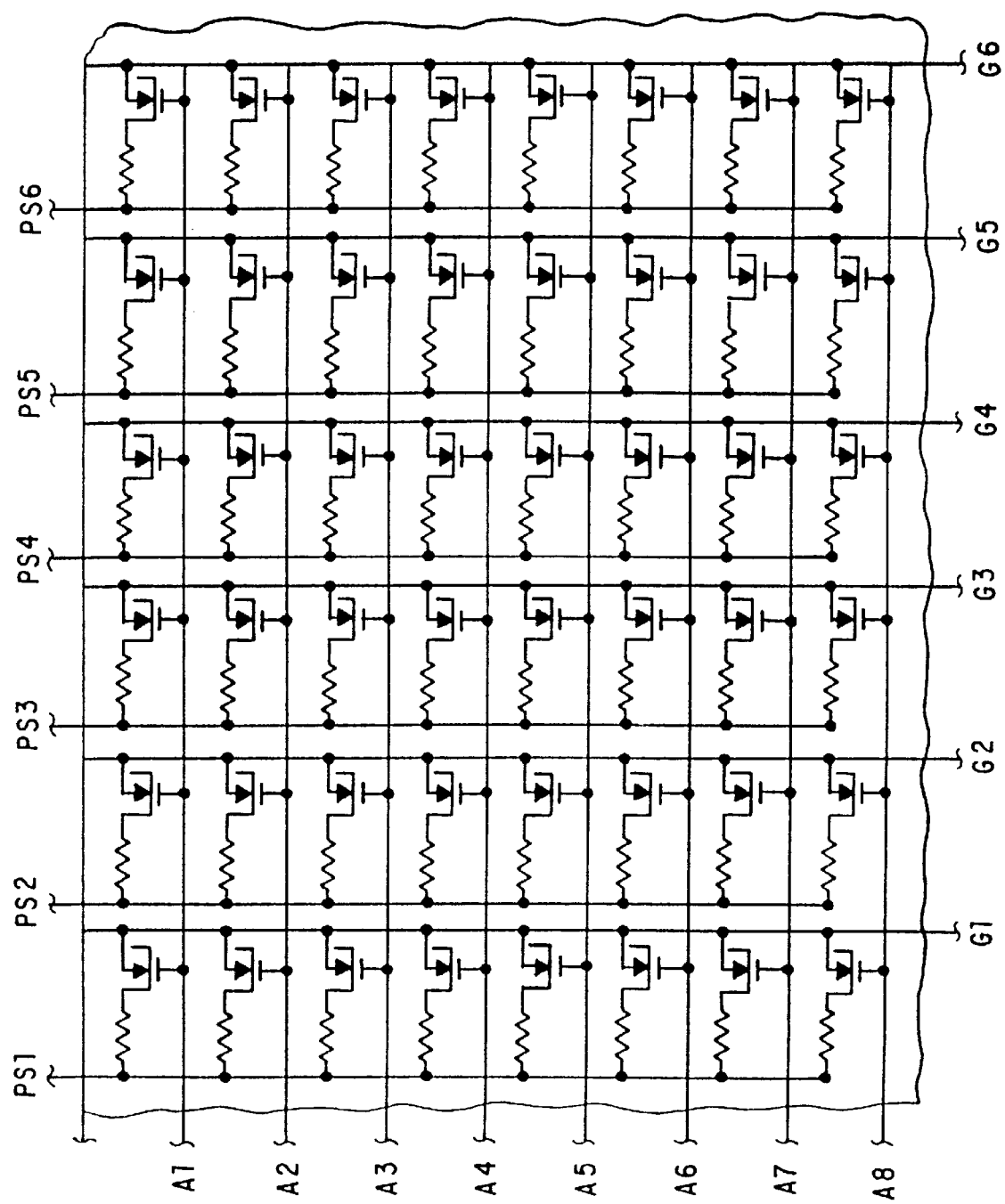
FIG. 11 is an enlarged schematic diagram of the address select lines and a portion of the associated ink ejection elements, primitive select lines and ground lines.

Referring now to the electrical schematic of FIG. 11, the interconnections for controlling the printhead assembly driver circuitry include separate address select, primitive select and primitive common interconnections. The driver circuitry of this particular embodiment comprises an array of 24 primitive lines, 24 primitive commons, and eight address select lines to control 192 ink ejections elements. The ink ejection elements 96 are organized as twenty-four primitives (See FIG. 9) and eight address lines. Specifying an address line and a primitive line uniquely identifies one particular ink ejection chamber 94 and ink ejection element 96 of the 192 possible. Shown in FIG. 11 are all eight address lines, but only six (P1–PS6) of the 24 primitive select lines. The number of nozzles within a primitive is equal to the number of address lines, or eight, in this particular embodiment. Any other combination of address lines and primitive select lines could be used; however, it is important to minimize the number of address lines in order to minimize the time required to cycle through the address lines. Another embodiment uses an array of 11 address select lines, 28 primitive lines and 28 primitive commons to control 308 ink ejection elements.

Each ink ejection element 96 is controlled by its own FET drive transistor, which shares its control input address select (A1–A8) with twenty-three other ink ejection elements. Each ink ejection element is tied to other ink ejection elements by a common node primitive select (PS1–PS24). Consequently, firing a particular ink ejection element requires applying a control voltage at its address select terminal and an electrical power source at its primitive select terminal. Only one address select line is enabled at one time. This ensures that the primitive select and group return lines supply current to at most one ink ejection element at a time. Otherwise, the energy delivered to a heater ink ejection element would be a function of the number of ink ejection elements 96 being energized at the same time.

Figure 12:
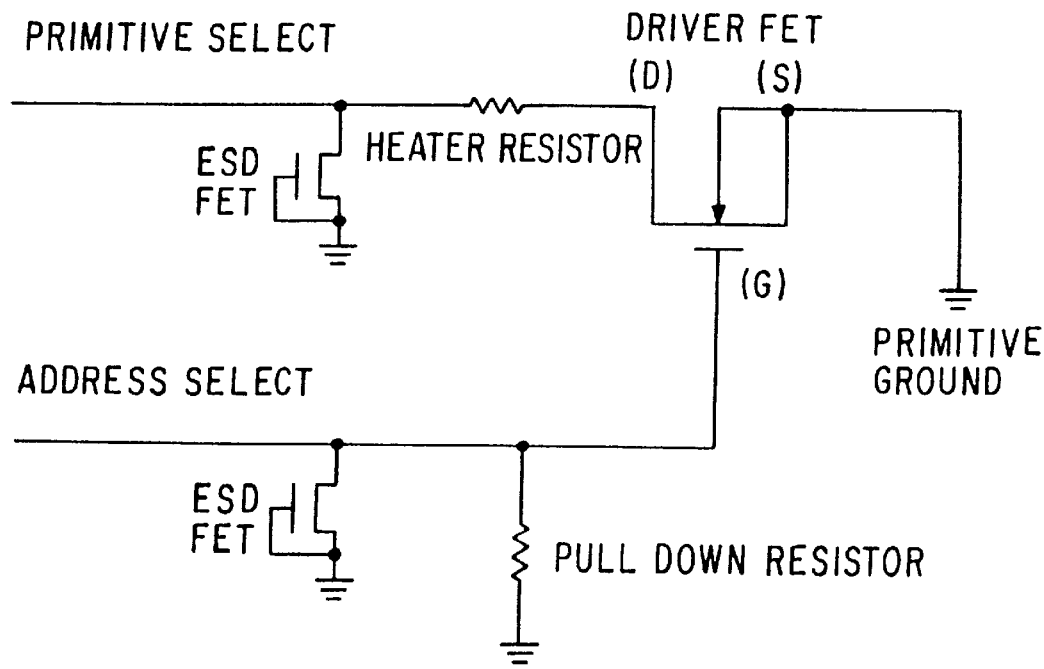
FIG. 12 is a schematic diagram of one ink ejection element of FIG. 11 and its associated address line, drive transistor, primitive select line and ground line.

FIG. 12 is a schematic diagram of an individual ink ejection element and its FET drive transistor. As shown, address select and primitive select lines also contain transistors for draining unwanted electrostatic discharge and a pull-down resistor to place all unselected addresses in an off state.

Figure 13:
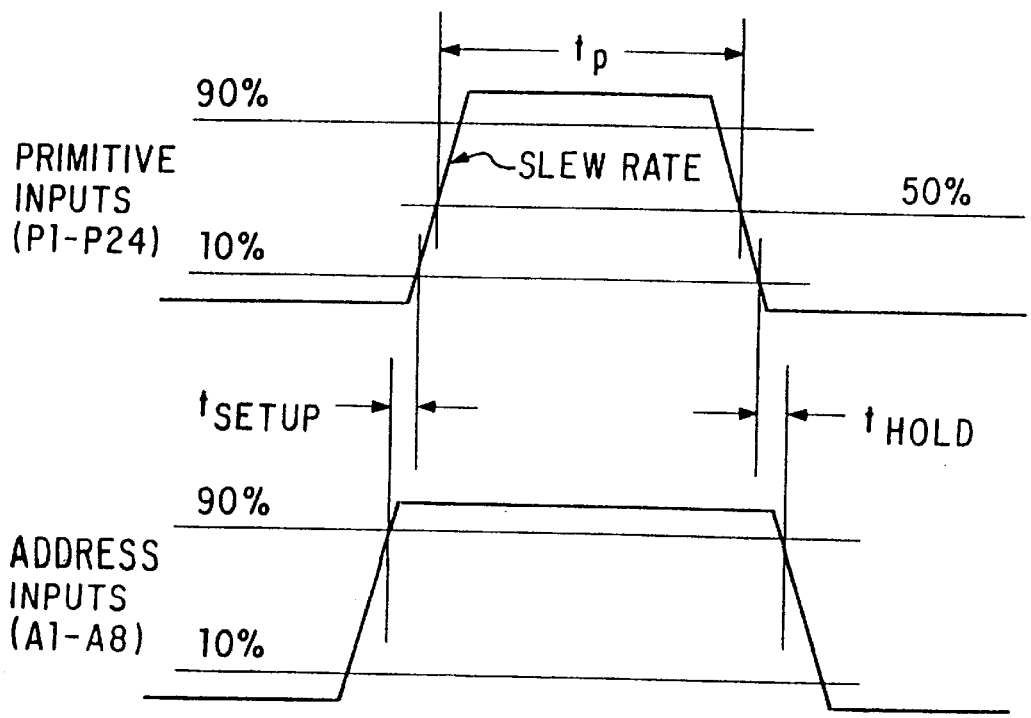
FIG. 13 is a schematic timing diagram for the setting of the address select and primitive select lines.

The address select lines are sequentially turned on via printhead assembly interface circuitry according to a firing order counter located in the printer and sequenced (independently of the data directing which ink ejection element is to be energized) from A1 to A8 when printing form left to right and from A8 to A1 when printing from right to left. The print data retrieved from the printer memory turn on any combination of the primitive select lines. Primitive select lines (instead of address select lines) are used in the preferred embodiment to control the pulse width. Disabling address select lines while the drive transistors are conducting high current can cause avalanche breakdown and consequent physical damage to MOS transistors. Accordingly, the address select lines are "set" before power is applied to the primitive select lines, and conversely, power is turned off before the address select lines are changed as shown in FIG. 13.

In response to print commands from the printer, each primitive is selectively energized by powering the associated primitive select interconnection. To provide uniform energy per heater ink ejection element only one ink ejection element is energized at a time per primitive. However, any number of the primitive selects may be enabled concurrently. Each enabled primitive select thus delivers both power and one of the enable signals to the driver transistor. The other enable signal is an address signal provided by each address select line only one of which is active at a time. Each address select line is tied to all of the switching transistors so that all such switching devices are conductive when the interconnection is enabled. Where a primitive select interconnection and an address select line for a heater ink ejection element are both active simultaneously, that particular heater ink ejection element is energized. Thus, firing a particular ink ejection element requires applying a control voltage at its address select terminal and an electrical power source at its primitive select terminal. Only one address select line is enabled at one time. This ensures that the primitive select and group return lines supply current to at most one ink ejection element at a time. Otherwise, the energy delivered to a heater ink ejection element would be a function of the number of ink ejection elements 96 being energized at the same time.

The ability to eject multiple individual ink drops at a high frequency is determined by the (1) minimum time to sequence through address lines, (2) ejection chamber refill time, (3) drop stability and (4) maximum data transmission rates between the printer and print cartridge. Designing the printhead with a small number of address lines is a key to high speed ink ejection by reducing the time it takes to complete the sequence through address lines. Since there are fewer nozzles within each primitive than on prior printhead designs, the ejection frequency of a single nozzle can be much higher. Also, as discussed above, the swath width can be programmed to use fewer nozzles and allow for even higher ejection rates.

There are two frequencies associated with multi-drop printing. They are defined as a base frequency (F) and a burst frequency (f). The base frequency is established by the scanning carriage speed in inches per second multiplied by the resolution or pixel size in dots per inch. The base frequency is the ejection frequency required to eject one drop per pixel at the scanning carriage speed. The base period for a pixel is equal to 1/F. For example, for a carriage speed of 20 inches/sec and a resolution of 600 dots per inch (dpi) printing:

Base Frequency=F=(20 inches/sec)×600 dpi=12,000 dots/sec=12 kHz

Base Period=1/F=$\frac{1}{12,000}$=83.33 microseconds

The burst frequency, f, is always equal to or greater than the base frequency, F. The burst frequency is related to the maximum number of drops to be deposited on any single pixel in a single pass of the scanning carriage. The maximum number of drops that can be deposited on a pixel in one pass (see discussion of subcolumns below) is equal to the number of address lines. Thus, the burst frequency is equal to the base frequency multiplied by the maximum number of drops to be placed in a given pixel in a single pass. Therefore, for the base frequency of 12 kHz in the example above, if 4 drops are to be placed in a pixel, the burst frequency would need to be approximately 48 kHz and for 8 drops it would need to be approximately 96 kHz. If 96 kHz is too high a frequency for the ink ejection chamber to operate, the carriage speed could be reduced to 10 inches per second which reduces the base frequency to 6 kHz and the burst frequency for 8 drops to 48 kHz.

The approximate maximum burst frequency is determined from the following equation:

$$\text{maximum burst frequency} \simeq \frac{1}{(\text{No. of Addresses})(\text{Ejection Pulse Width} + \text{Delay})}$$

As the number of address lines decrease and ejection pulse width decreases, the maximum frequency increases. A minimum burst frequency of 50 kHz is guaranteed if there are eight address lines and ejection pulse widths less than 2.125 microseconds.

Figure 14:
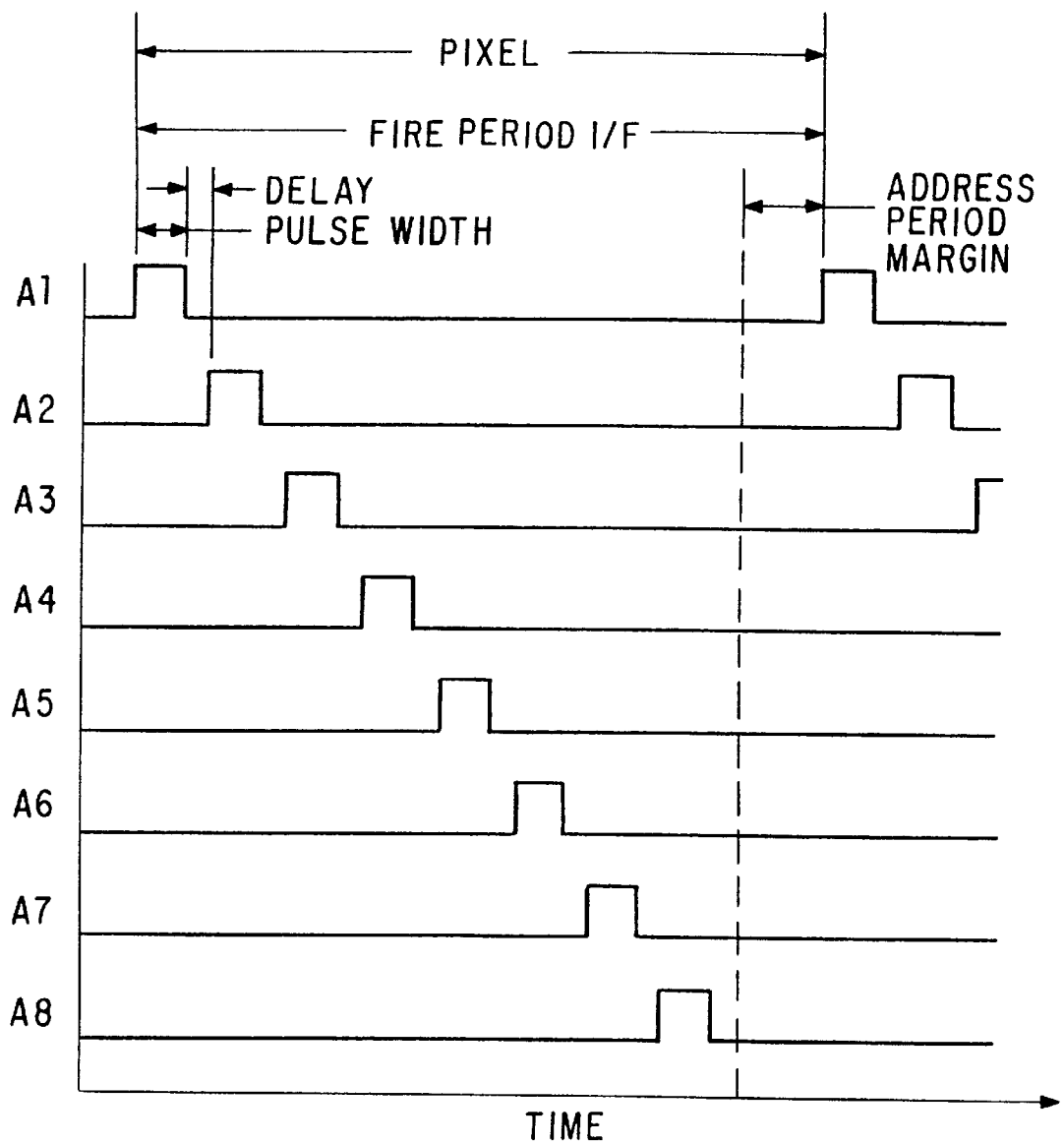
FIG. 14 is a schematic diagram of the firing sequence for the address select lines when the printer carriage is moving from left to right.

FIG. 14 shows the firing sequence when the print carriage is scanning from left to right. The firing sequence is reversed when scanning from right to left. A base period is the total amount of time required to activate all of the address lines, and to prepare to repeat the process. Each address period requires a pulse width time and a delay time which can include time to prepare to receive the data, and a variable amount of delay time applied to the data stream. The result of the number of address lines times the pulse width plus delay time generally consumes most of the total available base period. Any time left over is called the address period margin.

Figure 15A:
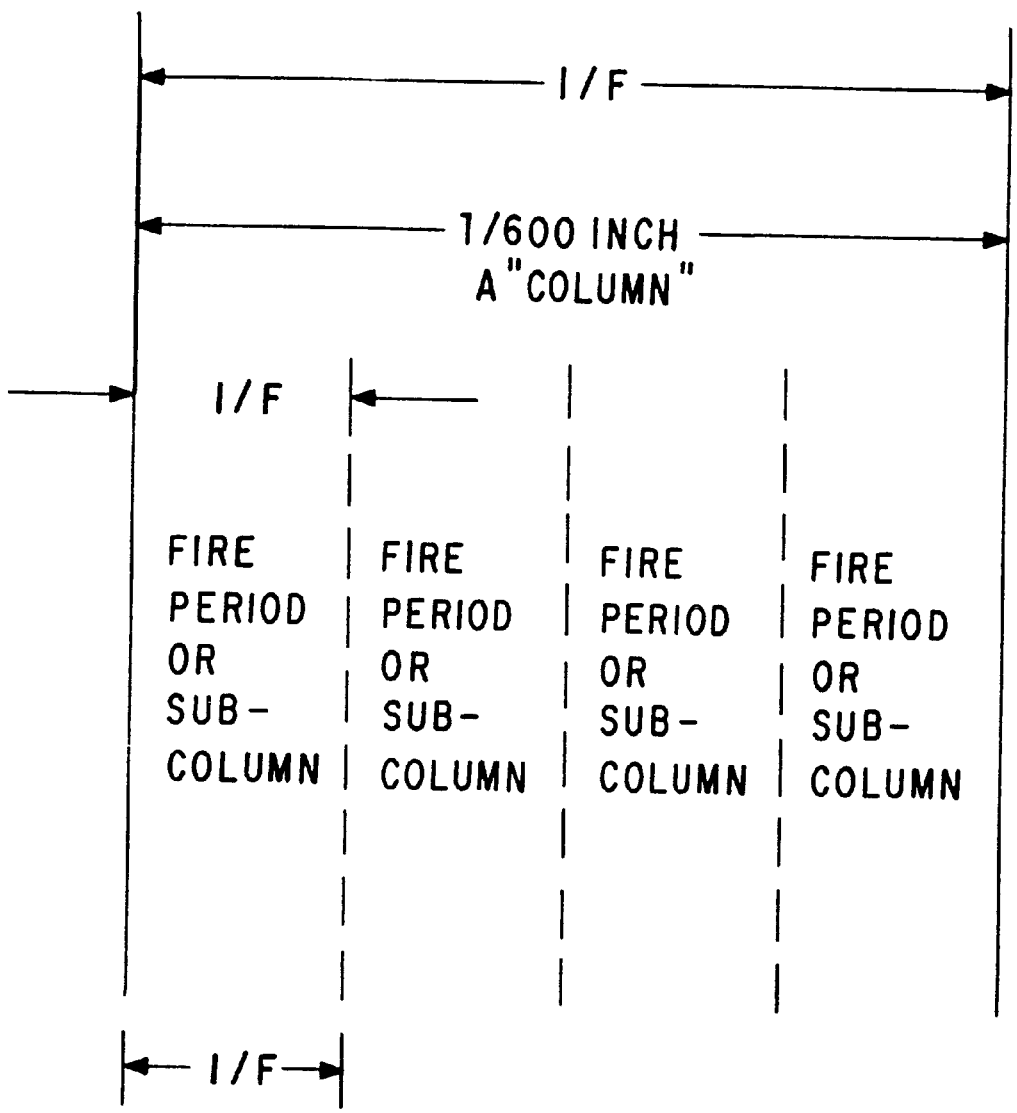
FIG. 15 shows the sub-columns for 4 drops and 8 drops per column or pixel.
Figure 15B:
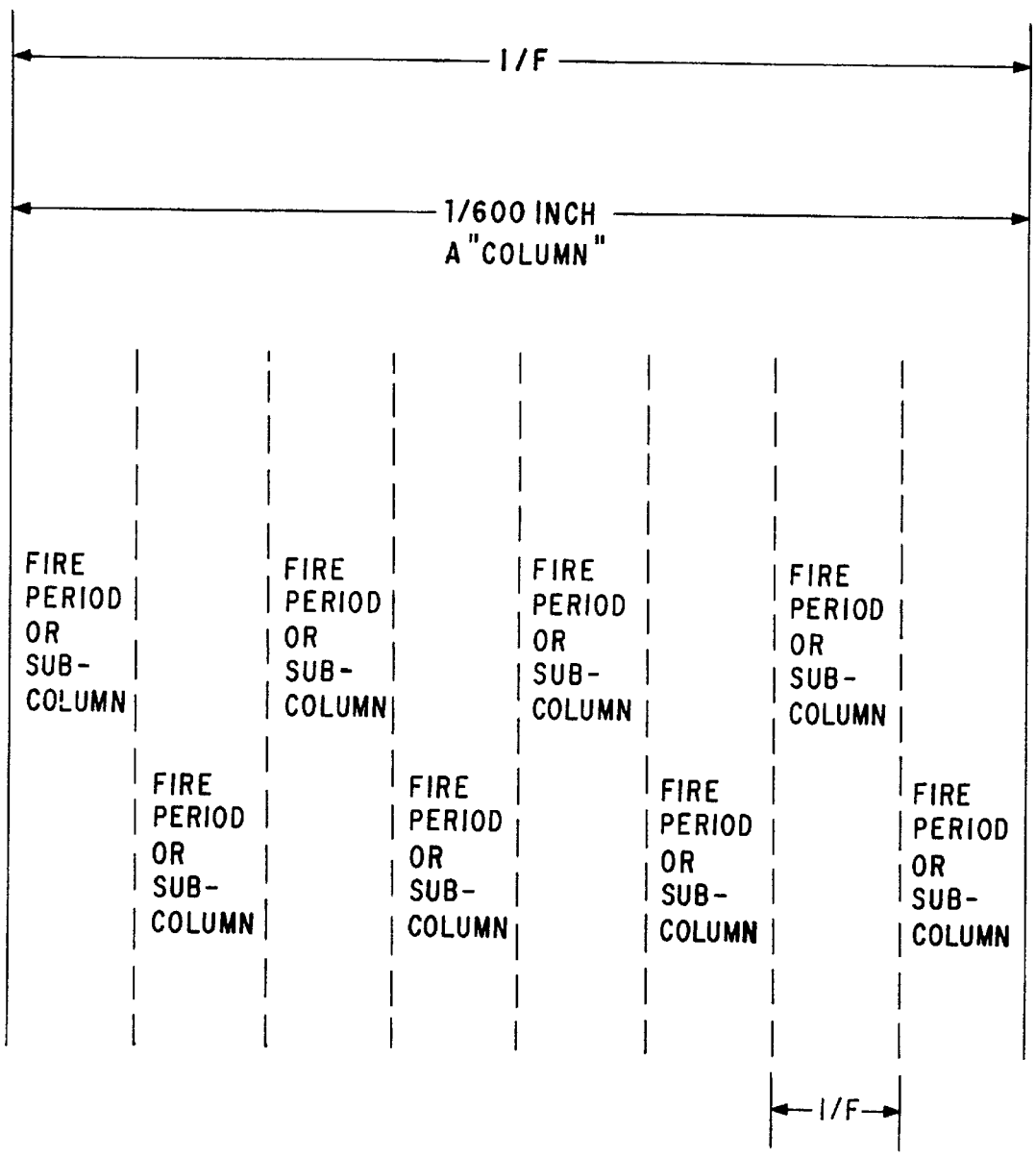

Referring to FIGS. 14 and 15, the base period (1/F) is determined by the scan velocity of the carriage and the base resolution or pixels per inch. The number of sub-columns, or sub-pixels, per pixel is defined by the total number of drops ejected on the pixel. For example, a carriage scan speed of 20 inches/second means that for each 600 dpi pixel, the base period, 1/F is (1/20 inches/sec)×(1/600 dots/inch)=83.33 microseconds. If there are 4 sub-columns, or sub-pixels, for each 600 dpi pixel, (i.e., the number of drops per 600 dpi pixel), a total of (83.33 microseconds)/(4 ejection periods)=20.83 microseconds are available for each burst period. Dividing this time by the number of address lines (20.83 microseconds)/(8 address lines)=2.60 seconds/address line gives the maximum time available for each of the address lines. The total of the pulse width and delay times must be less than this time period. The address period margin shown in FIG. 14 is to prevent address select cycles from overlapping by allowing for some amount of carriage velocity instability. The address period margin is set to a minimal acceptable value.

Referring to FIG. 15, shown are the sub-columns for four drops per column or pixel and 8 drops/column which correspond to virtual resolutions of 2400 and 4800 dpi, respectively, or to burst frequencies of 48 and 96 kHz, respectively for a carriage speed of 20 inches per second. For 4 drops/column and 8 drops/column the 8 address lines are cycled through 4 and times, respectively. Other numbers of sub-columns, or sub-pixels, and the corresponding virtual resolutions are also possible such as: 1 drop/column (600 dpi), 2 drops/column (1200 dpi), 3 drops/column (1800 dpi), 5 drops/column (3000 dpi), 6 drops/column (3600 dpi) and 7 drops/column (4200 dpi), where a column refers to a 600 dpi pixel. The virtual resolutions of 1200, 1800, 2400, 3000, 3600, 4200 and 4800 dpi correspond to burst frequencies of 24, 36, 48, 60, 72, 84 and 96 kHz, respectively, for a base frequency of 12 kHz. If the carriage scan velocity is reduced, the base frequency and burst frequency are reduced accordingly. Thus, the virtual resolution of the printer is determined by the number of drops ejected in each 600 dpi pixel in physical space or within the base time period (1/F) in temporal space.

In prior printheads, an entire column of data is assembled in printer logic and the printer itself controls the sequence of firing the printhead address and primitive lines which were demultiplexed as described above. With the present printhead having integrated logic on the printhead, data is transmitted to the printhead and the printhead decodes this data into address and primitive ejection control. Data for all 8 address lines must be sequentially sent to the printhead for each sub-column. In the time domain, this is one ejection period as shown in FIG. 14. In the physical location domain, this is called one sub-column as shown in FIG. 15. The swath velocity of the printhead across the media is determined by the number of ink drops to be deposited on each pixel.

Figure 16:
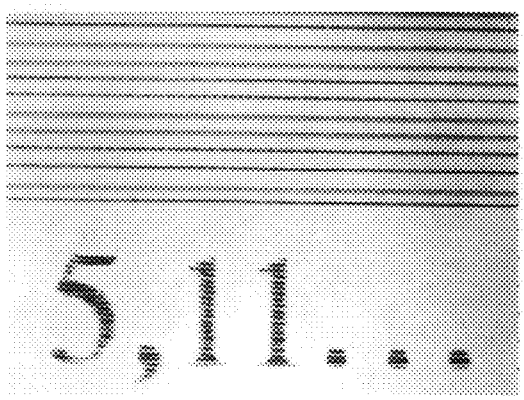
FIG. 16 shows how the printhead architecture of the present invention enables improved print quality.
Figure 16:
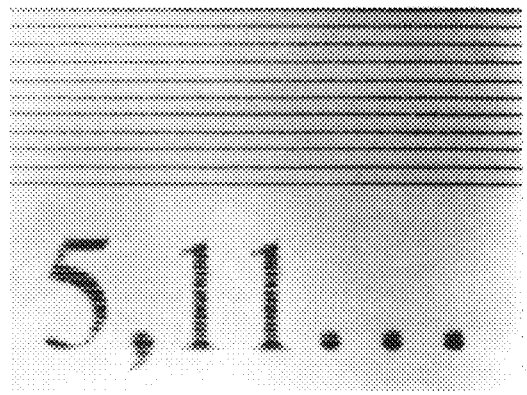
Figure 17:
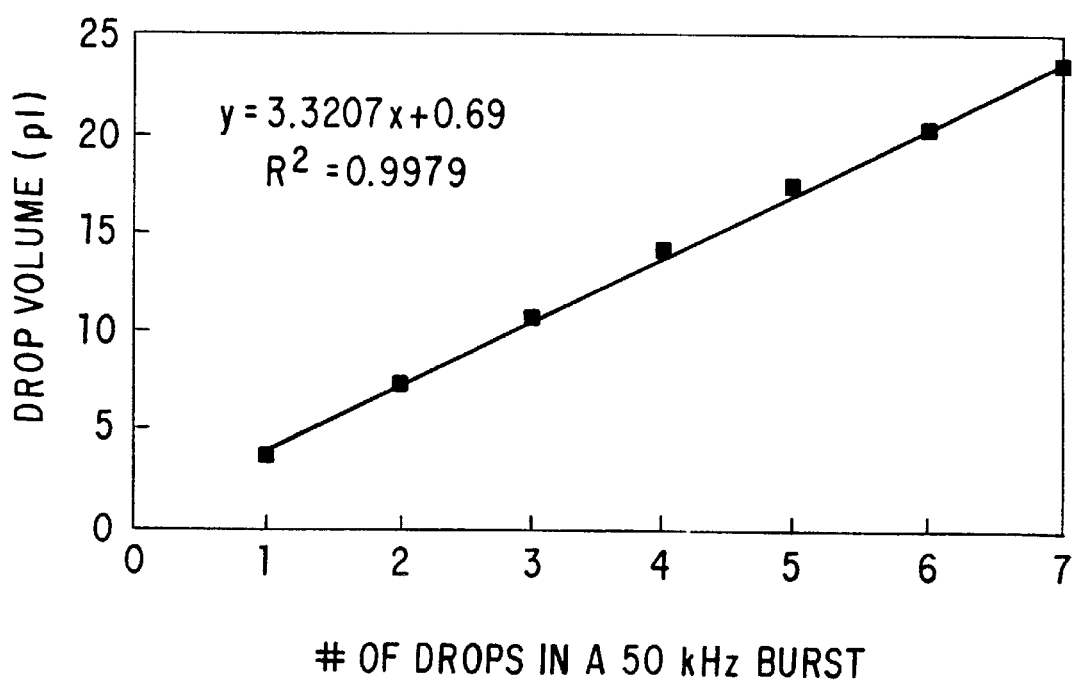
FIG. 17 shows how the printhead architecture of the present invention enables high frequency bursts to modulate drop volume.

FIG. 16, shows the large improvement in print quality due to the novel printhead design of the present invention which uses a nozzle member with reduced thickness. As shown in FIG. 17, the printhead design of the present invention creates a nearly constant drop volume for each of the high frequency bursts, unlike prior efforts to develop a useful multi-drop architecture wherein the first drop was the largest drop successive drops became smaller. Since the cumulative drop volume increases linearly with the burst count, the high frequency bursts can modulate the cumulative drop volume on the media by selecting the number of drops to be placed on any one pixel.

Previous methods such as multi-pass printing put more than one drop from a given printhead on a pixel, but these drops are placed on the pixel on separate passes. The disadvantages of this approach are: (1) throughput is compromised because a separate pass is required for each drop placed from a given printhead onto a pixel, (2) in areas of high density printing, drops are put into every pixel on every pass which leads to dot coalescence which degrades image quality, and (3) it is an inefficient way to cover white space in the midtone regions of the tone scale where slight drop placement variations are required to fill in white space. This is difficult when multiple drops are placed on a pixel in separate passes, because the dots formed by each pass may land on top of each other.

The printhead architecture of the present invention allows the use of multi-drop merge on media printing. The ability to achieve good tone scale is crucial to achieving photographic image quality. In the highlight region of the tone scale, nearly invisible dots and lack of graininess are required. Areas of solid fill require larger visible dots with saturated colors, high optical density and no white space.

Figure 18B:
FIG. 18 shows the difference in building up dot coverage with laying down multi-drops in one pass printing and multi-pass printing where drops are laid down in separate passes.
Figure 18A:
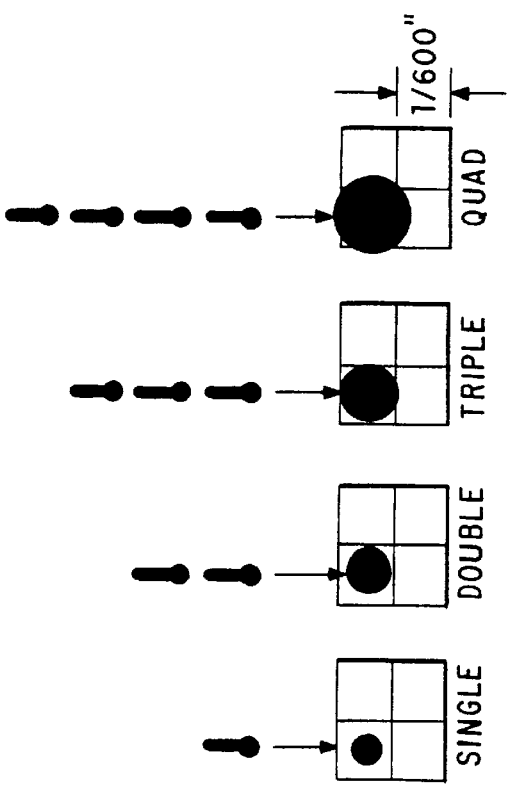

In multi-drop printing, individual drops merge on the media to form a composite drop of the individual drops. This printing method is an efficient way to create high quality images at high throughput. Highlight regions are formed by using single drops to form a dot. Individual drops are nearly invisible and can be used to form highlights with low graininess. As the density of the image increases, multi-drop dots are formed with two or more drops merging on the media. By allowing drops to merge together on media in a given pass, white space is more efficiently covered than with previous approaches. FIG. 18 shows the difference in building up dot coverage by laying down multiple drops in one pass and multi-pass printing where the drops are laid down in separate passes.

Figure 19:
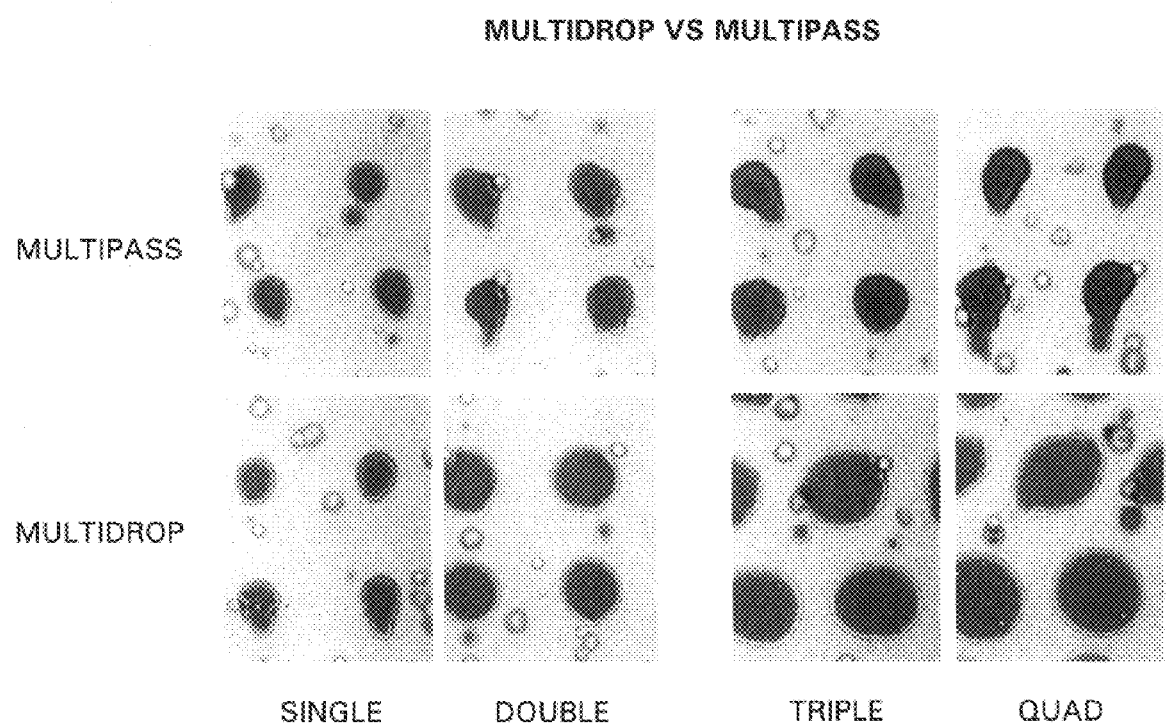
FIG. 19 shows an example of multi-drop vs single drop multi-pass printing, using one to four drops using the same printhead and media with only the printmode being changed.
Figure 20:
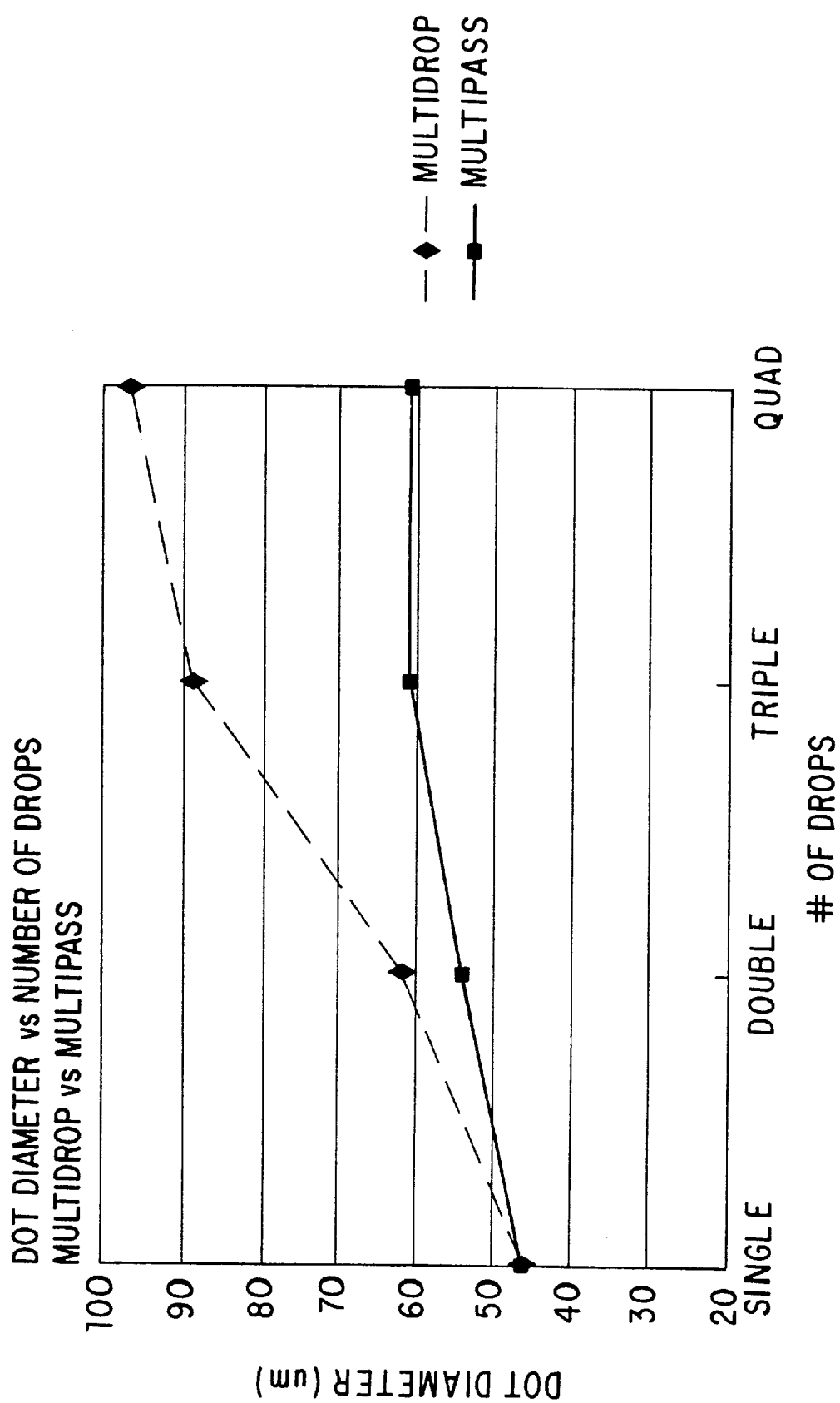
FIG. 20 shows a more efficient dot diameter growth with multi-drop printing than with multi-pass printing.
Figure 21:
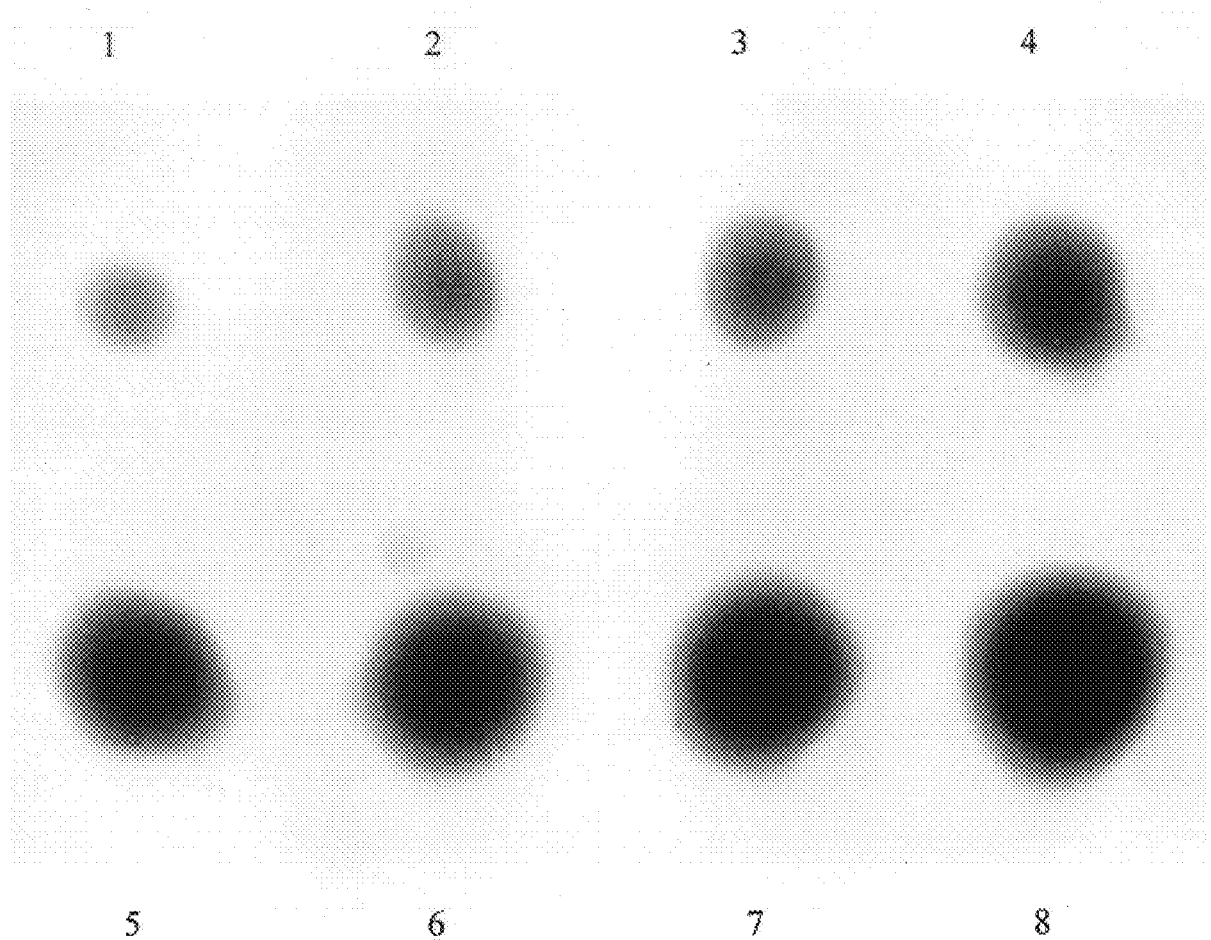
FIG. 21 shows the diameter for multi-drop dots that are formed by one to eight drops merging on the media to form dots.
Figure 22:
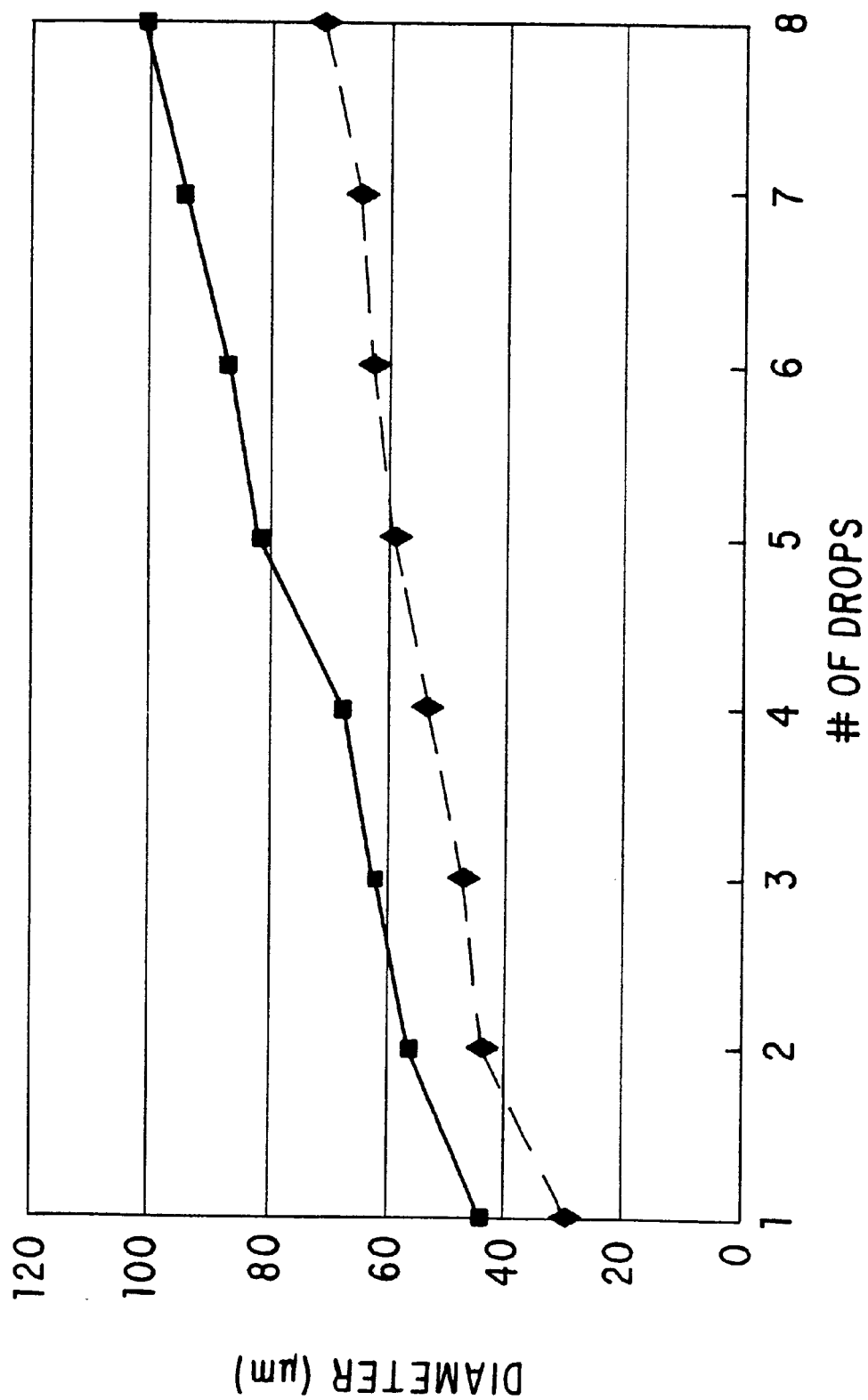
FIG. 22 shows dot size growth from one to eight drops for two different ink systems.

In multi-drop printing, a high frequency burst of drops is ejected from a printhead. These drops merge on the media to form a larger cumulative drop or dot. The size of a dot is determined by the number of drops deposited in the burst and by ink/media interactions. FIG. 19 shows an example of the volume, size and shape of the composite drop on the media for multi-drop and single drop multi-pass printing. This example used from one to four drops on a pixel and used the same printhead and media with only the printmode and firing frequency being changed. As can be seen in FIG. 20, much more efficient dot growth on the media is achieved with multi-drop printing versus multipass printing. FIG. 21 shows another example of the volume, size and shape of the composite drop or multi-drop dots that are formed by one to eight individual drops merging using 5.5 picoliter individual drops. FIG. 22 shows dot size growth from one to eight drops for two different ink systems. The solid top line is for a dye-based ink with an individual drop volume of 5.5 picoliters. The bottom dashed line is for a pigment-based ink with an individual drop volume of 3.0 picoliters. The essential requirement of multi-drop printing is a high ink ejection frequency. Highlight regions of the tone scale are formed by using single drop to form a dot. As the density of the image increases, multi-drop dots are utilized with two or more drops merging on the media.

The specific partial-inking pattern employed in each pass, and the way in which these different patterns add up to a single fully inked image, is known as a "printmode." The concept of printmodes is a useful and well-known technique of laying down in each pass of the printhead only a fraction of the total ink required in each section of the image, so that any areas left white in each pass are filled in by one or more later passes. This tends to control bleed, blocking and cockle by reducing the amount of liquid that is on the page at any given time. Printmodes allow a trade-off between speed and image quality. For example, a printer's draft mode provides the user with readable text as quickly as possible. Presentation, also known as best mode, is slow but produces the highest image quality. Normal mode is a compromise between draft and presentation modes. Printmodes allow the user to choose between these trade-offs. It also allows the printer to control several factors during printing that influence image quality, including: 1) the amount of ink placed on the media per dot location, 2) the speed with which the ink is placed, and, 3) the number of passes required to complete the image. Providing different printmodes to allow placing ink drops in multiple swaths can help with hiding nozzle defects. Different printmodes are also employed depending on the media type.

One-pass mode operation is used for high throughput on plain paper. The one pass mode is one in which all dots to be fired on a given row of dots are placed on the medium in one swath of the print head, and then the print medium is advanced into position for the next swath.

A two-pass printmode is a print pattern wherein one-half of the dots available for a given row of available dots per swath are printed on each pass of the printhead, so two passes are needed to complete the printing for a given row. Typically, each pass prints one-half of the dots on the swath area. Similarly, a four-pass mode is a print pattern wherein one fourth of the dots for a given row are printed on each pass of the printhead and an eight-pass mode is a print pattern wherein one eighth of the dots for a given row are printed on each pass of the printhead. Multiple pass thermal ink-jet printing is described, for example, in commonly assigned U.S. Pat. No. 4,963,882, entitled "Printing of Pixel Locations by an Ink Jet Printer Using Multiple Nozzles for Each Pixel or Pixel Row;" U.S. Pat. No. 4,965,593, entitled "Print Quality of Dot Printers;" and U.S. Pat. No. 5,555,006, entitled "Inkjet Printing: Mask-rotation-only at Page Extremes; Multipass Modes for Quality and Throughput on Plastic Media" and U.S. patent applications Ser. No. 08/810,747, filed Mar. 4, 1997, entitled "Bidirectional Color Printmodes with Semistaggared Swaths to Minimize Hue Shift and Other Artifacts;" Ser. No. 08/814,949, filed Mar. 10, 1997 entitled "Random Printmasks in a Multilevel Inkjet Printer;" Ser. No. 08/811,875, filed Mar. 4, 1997, entitled "Bi-directional Color Printing Using Multipass Printmodes with Swath-aligned Inkjet Printheads;" Ser. No. 08/811,788, filed Mar. 4, 1997, entitled "High Resolution Inkjet Printing Using Color Drop Placement on Every Pixel Row During a Single Pass." and Ser. No. 08/810,467, filed Mar. 4, 1997, entitled "Dynamic Multi-pass Print Mode Corrections to Compensate for Malfunctioning Inkjet Nozzles." The foregoing commonly assigned U.S. patents and U.S. patent applications are hereby incorporated by reference.

The pattern used in printing each nozzle section is known as the "printmode mask" or "printmask", or sometimes just "mask." The term "printmode" is more general, usually encompassing a description of a mask, or several masks, used in a repeated sequence and the number of passes required to reach "full density," and also the number of drops per pixel defining what is meant by full density.

A printmask is a binary pattern that determines exactly which ink drops are printed in a given pass or, to put the same thing in another way, which passes are used to print each pixel. In a printmode of a certain number of passes, each pass should print, of all the ink drops to be printed, a fraction equal roughly to the reciprocal of the number of passes. Thus, the printmask defines both the pass and the nozzle which will be used to print each pixel location, i.e., each row number and column number on the media. The printmask can be used to "mix up" the nozzles used, as between passes, in such a way as to reduce undesirable visible printing artifacts.

The hybrid multi-drop/multi-pass printing of the present invention combines the best features of multi-drop merge on media and multi-pass printing. Highlight and light midtone regions are printed the same as in conventional multi-drop printing (a multi-drop dot from a given printhead is energized into each pixel only once). Saturated areas and darker midtones are formed by printing a second multi-drop dot from a given printhead on a pixel in a different pass.

Figure 23:
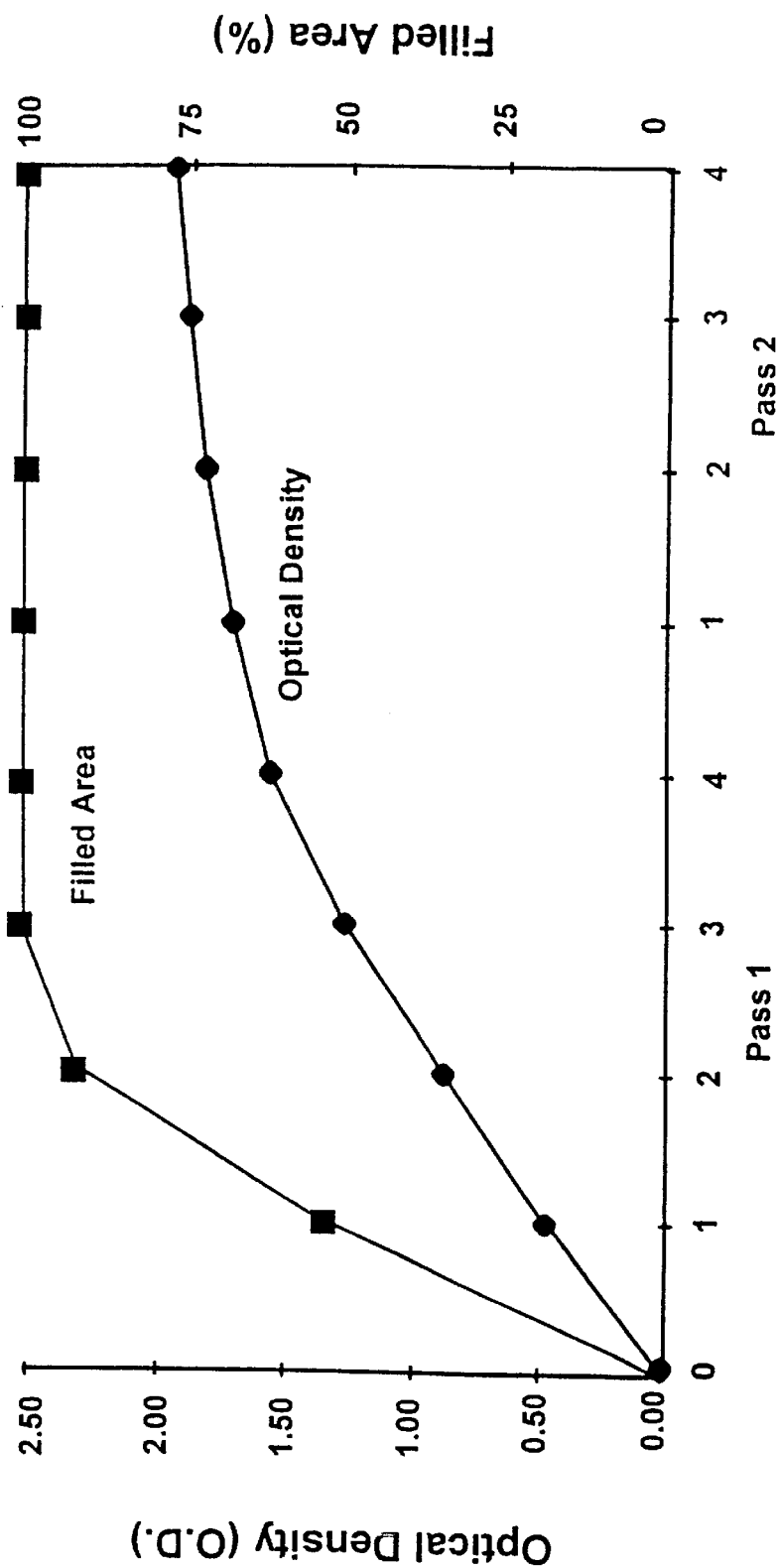
FIG. 23 shows how optical density and the percent of white space filled with dots changes in a two pass printmode as one to four multi-drop individual drops are put down in each of two passes.

FIG. 23 shows how optical density and the percent of white space filled with dots changes as one to four multi-drop individual drops are put down in each of two passes. A total of eight drops per pixel is required to give high optical density. All of the white space is filled in with the first four drops put down in pass one.

A comparison of multi-drop printing vs hybrid multi-drop/multi-pass printing for an eight-level, two-pass is shown Table IV below:

TABLE IV

| | Multi-drop | Multi-drop/ multi-pass |
|---|---|---|
| Number of drops/pixel in a given pass | 8 | 4 |
| Total drops/pixel | 8 | 8 |
| Ink ejection frequency at 20 ips, 600 dpi | 96 | 48 |

As described above, in accordance with the present invention, data input is received by a printer. Dot data, which indicates the location of dots on a print medium, is generated from the data input. Pulses are provided to the printhead which result in ink being ejected through nozzles located on the printhead. The pulses used to generate the dots are selected from a train of firing pulses. The firing pulses within the train of firing pulses repeats at a frequency that is higher than the pixel frequency. Selecting the number of different firing pulses to use determines the number of drops to placed within a pixel on the print medium.

While the present hybrid multi-drop/multi-pass printmode invention is further illustrated below in terms of an eight-level, four-pass hybrid multi-drop/multi-pass printmode, one skilled in the art will recognize that the invention is applicable to any number of passes and other levels, i.e., number of multiple merge on media drops per pixel.

Table V below shows a level map used to implement an eight-level, four-pass hybrid multi-drop/multi-pass printmode. Table V defines how ink drop levels are printed on a per pass basis. Groups A–D are four groups of pixels that correspond to positions in an 8 by 8 printmask. Generally, a group is defined for each pass and each group has a defined level value for each pass. Column headings P1 to P4 represent each of the passes in a four-pass printmode. In this particular example, 1 to 4 drops from a given printhead are placed in a pixel on a single pass and an additional 1 to 4 drops are placed into the same pixel on a different pass.

TABLE V

| LEVEL | Group A | | | | Group B | | | | Group C | | | | Group D | | | |
|---|---|---|---|---|---|---|---|---|---|---|---|---|---|---|---|---|
| | P1 | P2 | P3 | P4 | P1 | P2 | P3 | P4 | P1 | P2 | P3 | P4 | P1 | P2 | P3 | P4 |
| 1 | 1 | 0 | 0 | 0 | 0 | 1 | 0 | 0 | 0 | 0 | 1 | 0 | 0 | 0 | 0 | 1 |
| 2 | 2 | 0 | 0 | 0 | 0 | 2 | 0 | 0 | 0 | 0 | 2 | 0 | 0 | 0 | 0 | 2 |
| 3 | 3 | 0 | 0 | 0 | 0 | 3 | 0 | 0 | 0 | 0 | 3 | 0 | 0 | 0 | 0 | 3 |
| 4 | 4 | 0 | 0 | 0 | 0 | 4 | 0 | 0 | 0 | 0 | 4 | 0 | 0 | 0 | 0 | 4 |
| 5 | 4 | 0 | 1 | 0 | 0 | 4 | 0 | 1 | 1 | 0 | 4 | 0 | 0 | 1 | 0 | 4 |
| 6 | 4 | 0 | 2 | 0 | 0 | 4 | 0 | 2 | 2 | 0 | 4 | 0 | 0 | 2 | 0 | 4 |
| 7 | 4 | 0 | 3 | 0 | 0 | 4 | 0 | 3 | 3 | 0 | 4 | 0 | 0 | 3 | 0 | 4 |
| 8 | 4 | 0 | 4 | 0 | 0 | 4 | 0 | 4 | 4 | 0 | 4 | 0 | 0 | 4 | 0 | 4 |

Shown in Table VI below is a corresponding 8 by 8 spatial distribution matrix. This matrix has only as many groups as there are passes.

TABLE VI

| A | B | C | D | A | B | C | D |
|---|---|---|---|---|---|---|---|
| D | A | B | C | D | A | B | C |
| C | D | A | B | C | D | A | B |
| B | C | D | A | B | C | D | A |
| A | B | C | D | A | B | C | D |
| D | A | B | C | D | A | B | C |
| C | D | A | B | C | D | A | B |
| B | C | D | A | B | C | D | A |

The hybrid multi-drop and multi-pass printing of the present invention combines the best aspects of multi-drop merge on media printing and multi-pass printing. In multi-drop printing individual drops merge on the media to form a composite drop of the individual drops. This printing method is an efficient way to create high quality images. Highlight regions are formed by using single drops to form a dot. Individual drops are nearly invisible and can be used to form highlights with low graininess. As the density of the image increases, multi-drop dots are formed with two or more drops merging on the media. By allowing drops to merge together on media in a given pass, white space is more efficiently covered than with previous approaches. For hybrid multi-drop and multi-pass printing of the present invention, the advantages of multi-drop merge on media printing are retained while optical density is increased with no loss of throughput while enabling printing at reduced ink ejection frequency. In addition, multiple passes can be used for error hiding and also to improve ink/media interaction.

While particular embodiments of the present invention have been shown and described, it will be obvious to those skilled in the art that changes and modifications may be made within departing from this invention in its broader aspects and, therefore, the appended claims are to encompass within their scope all such changes and modifications as fall within the true spirit and scope of this invention.

What is claimed is:

1. A method of printing on a media surface, comprising the steps of:

mounting an array of ink ejection elements for a single printhead in a carriage, where the array of ink ejection elements defines a swath width;

initially passing the carriage along a carriage scan axis perpendicular to a media advance direction, so that a path of the array of ink ejection elements defines a swath area on the media surface;

initially energizing ink ejection elements during said initial passing step thereby causing a predetermined number of initial ink droplets to be ejected onto the media surface at a predetermined individual pixel location on the media;

subsequently passing the carriage along the carriage scan axis;

subsequently energizing ink ejection elements during said subsequent passing step thereby causing a predetermined number of subsequent ink droplets to be ejected onto the media surface at the predetermined individual pixel location on the media;

maintaining the number of initial and subsequent ejected ink drops as substantially separate drops until the ink drops merge upon impact with the media.

2. The method of claim 1 wherein said initial and subsequent passing steps total two to four passes.

3. The method of claim 1 wherein said initial and subsequent passing steps total four to six passes.

4. The method of claim 1 wherein said initial and subsequent passing steps total six to eight passes.

5. The method of claim 1 wherein said initial and subsequent passing steps are bi-directional passes.

6. The method of claim 1 wherein said initially energizing step includes causing the number of initial ink droplets to be in a range of zero to two.

7. The method of claim 1 wherein said initially energizing step includes causing the number of initial ink droplets to be in a range of zero to four.

8. The method of claim 1 wherein said initially energizing step includes causing the number of initial ink droplets to be in a range of zero to six.

9. The method of claim 1 wherein said initially energizing step includes causing the number of initial ink droplets to be in a range of zero to eight.

10. The method of claim 1 wherein said subsequently energizing step includes causing the number of subsequent ink droplets to be in a range of zero to two.

11. The method of claim 1 wherein said subsequently energizing step includes causing the number of subsequent ink droplets to be in a range of zero to four.

12. The method of claim 1 wherein said subsequently energizing step includes causing the number of subsequent ink droplets to be in a range of zero to six.

13. The method of claim 1 wherein said subsequently energizing step includes causing the number of subsequent ink droplets to be in a range of zero to eight.

14. The method of claim 1 wherein before said subsequently passing step the media is advanced in the media advance direction.

15. A method for printing comprising the steps of:
providing a scanning carriage having a predetermined velocity and a predetermined pixel resolution, the velocity and the pixel resolution defining a base ink ejection frequency;
mounting an array of ink ejection elements for a single color in the scanning carriage for ejecting drops of ink;
initially passing the ink ejection elements over a media surface by moving the carriage along a carriage scan axis while energizing the ink ejection elements at a burst frequency which is equal to or greater than the base frequency, thereby causing a predetermined number of initial ink drops to be ejected from the ink ejection elements at the burst frequency onto the media surface at a predetermined individual pixel location;
subsequently passing the ink ejection elements over the media surface by moving the carriage along the carriage scan axis while energizing the ink ejection elements at the burst frequency to cause a predetermined number of subsequent ink drops to be ejected from the ink ejection elements at the burst frequency onto the media surface at the predetermined individual pixel location; and
maintaining the predetermined number of initial and subsequent ink drops ejected in the initial passing step and the subsequent passing step as substantially separate drops until the ink drops merge upon impact with the media.

16. The method of claim 15 wherein said initial and subsequent passing steps total two to four passes.

17. The method of claim 15 wherein said initial and subsequent passing steps total four to eight passes.

18. The method of claim 15 wherein said initial and subsequent passing steps are bi-directional passes.

19. The method of claim 15 wherein said initially energizing step includes causing the number of initial ink droplets to be in a range of zero to eight.

20. The method of claim 15 wherein said subsequently energizing step includes causing the number of subsequent ink droplets to be in a range of zero to eight.

21. The method of claim 15 wherein said initially energizing step includes causing the initial ink droplets to be ejected at a frequency greater than 20 kHz.

22. The method of claim 15 wherein said initially energizing step includes causing the initial ink droplets to be ejected at a frequency greater than 30 kHz.

23. The method of claim 15 wherein said initially energizing step includes causing the initial ink droplets to be ejected at a frequency greater than 40 kHz.

24. The method of claim 15 wherein said initially energizing step includes causing the initial ink droplets to be ejected at a frequency greater than 50 kHz.

25. A method of printing, comprising the steps of:
providing a printhead including a plurality of ink ejection elements;
energizing the ink ejection elements to generate a first predetermined number of ink droplets to be ejected onto a media at a predetermined pixel location on the media; and
energizing the ink ejection elements after the first predetermined number of ink droplets having been ejected onto the media to generate a second predetermined number of ink droplets to be ejected onto the predetermined pixel location on the media;
wherein one of the first predetermined number and the second predetermined number of ink droplets includes a plurality of ink droplets.

26. The method as claimed in claim 25 further comprising mounting the printhead in a carriage.

27. The method as claimed in claim 26 further comprising passing the carriage along a carriage scan axis perpendicular to the media advance direction, wherein a path of the array of ink ejection elements a swath area.

28. The method as claimed in claim 25 wherein the plurality of ink droplets remain substantially separate droplets until the impact with the media.

* * * * *

UNITED STATES PATENT AND TRADEMARK OFFICE
CERTIFICATE OF CORRECTION

PATENT NO. : 6,193,347 B1
DATED : February 27, 2001
INVENTOR(S) : Askeland et al.

It is certified that error appears in the above-identified patent and that said Letters Patent is hereby corrected as shown below:

<u>Title page,</u>
References Cited, Foreign Patent Documents, delete "0507124A2" and insert in lieu thereof -- 0507134A2 --

Signed and Sealed this

Twenty-seventh Day of November, 2001

Attest:

*Attesting Officer*

NICHOLAS P. GODICI
*Acting Director of the United States Patent and Trademark Office*